US011833479B2

(12) United States Patent
Hein et al.

(10) Patent No.: US 11,833,479 B2
(45) Date of Patent: Dec. 5, 2023

(54) CATALYST SLURRY MIXING PROCESS AND SYSTEM

(71) Applicant: Chevron Phillips Chemical Company LP, The Woodlands, TX (US)

(72) Inventors: James E. Hein, Houston, TX (US); Scott E. Kufeld, Houston, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 924 days.

(21) Appl. No.: 16/831,571

(22) Filed: Mar. 26, 2020

(65) Prior Publication Data

US 2021/0299618 A1 Sep. 30, 2021

(51) Int. Cl.
| | |
|---|---|
| B01F 23/50 | (2022.01) |
| B01F 23/53 | (2022.01) |
| B01F 27/112 | (2022.01) |
| B01J 8/00 | (2006.01) |
| C08F 4/78 | (2006.01) |
| C08F 2/00 | (2006.01) |
| C08F 2/12 | (2006.01) |
| B01F 23/00 | (2022.01) |

(52) U.S. Cl.
CPC .............. *B01F 23/51* (2022.01); *B01F 23/53* (2022.01); *B01F 27/112* (2022.01); *B01J 8/0015* (2013.01); *C08F 2/00* (2013.01); *C08F 4/78* (2013.01); *B01F 23/024* (2022.01); *B01F 23/565* (2022.01)

(58) Field of Classification Search
CPC ....... B01F 23/53; B01F 23/565; B01F 27/112
USPC ....................................................... 526/919
See application file for complete search history.

(56) References Cited

U.S. PATENT DOCUMENTS

| | | | |
|---|---|---|---|
| 4,587,314 A | 5/1986 | Wilt | |
| 5,500,396 A | 3/1996 | Martin | |
| 6,024,481 A | 2/2000 | Hillström et al. | |
| 6,082,890 A | 7/2000 | Heinzmann et al. | |
| 7,906,597 B2 * | 3/2011 | Fouarge | B01J 8/0035 |
| | | | 526/919 |
| 9,273,157 B2 | 3/2016 | Brusselle | |
| 9,512,245 B2 | 12/2016 | Brusselle et al. | |

(Continued)

FOREIGN PATENT DOCUMENTS

JP 2001247606 A 9/2001

OTHER PUBLICATIONS

International Search Report and Written Opinion issued in corresponding application No. PCT/US2021/022661, dated Jun. 17, 2021, 11 pages.

*Primary Examiner* — Fred M Teskin
(74) *Attorney, Agent, or Firm* — Conley Rose P.C.

(57) ABSTRACT

Disclosed are a process and system for preparing a catalyst slurry. The process can include preparing a catalyst slurry comprising a solid particulate catalyst and a carrier liquid in a catalyst slurry preparation system. The catalyst slurry preparation system can include a mixing vessel, a rotatable impeller system connected to the mixing vessel, and a motor connected to the rotatable impeller system. The rotatable impeller system can include an agitator shaft and a hub connected to the agitator shaft. The hub and at least a portion of the agitator shaft are positioned within the mixing vessel along a longitudinal axis of the mixing vessel, and the hub has at least three blades.

20 Claims, 8 Drawing Sheets

(56) References Cited

U.S. PATENT DOCUMENTS

| | | | |
|---|---|---|---|
| 2004/0145966 A1* | 7/2004 | Kar | B01F 27/1123 366/329.1 |
| 2013/0130890 A1* | 5/2013 | Brusselle | B01F 27/191 502/150 |
| 2017/0233505 A1 | 8/2017 | Kuehl | |

* cited by examiner

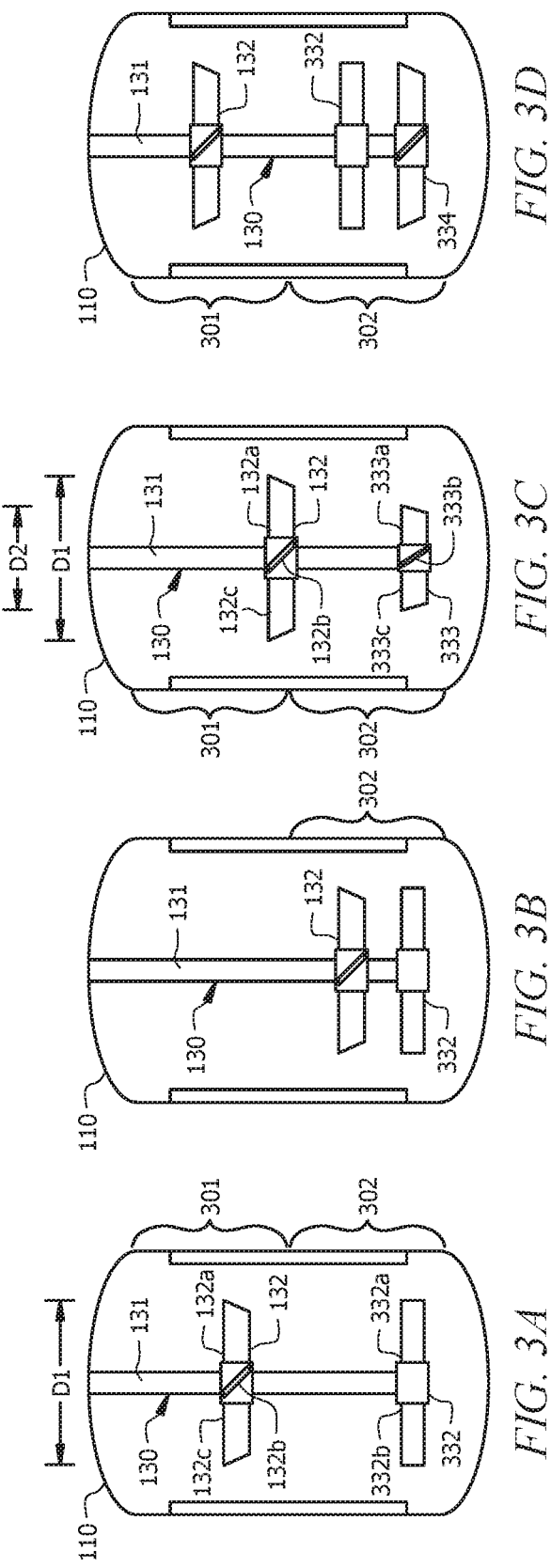

CATALYST SLURRY MIXING PROCESS AND SYSTEM

TECHNICAL FIELD

The present disclosure relates to the catalyst that is used for the polymerization of olefins.

BACKGROUND

Polyolefins can be prepared by polymerization of an olefin monomer in a polymerization reactor in which feed materials such as the olefin monomer, an olefin comonomer, catalyst, activator, chain transfer agent, and catalyst diluent are introduced. The polymerization reaction within the reactor yields polyolefin as part of a polymerization product.

The concentration of catalyst in the polymerization reactor can affect reactor conditions and polyolefin characteristics such as density and molecular weight. For example, a change in the concentration of catalyst concentration from a first concentration to a second concentration can cause a polymerization reactor that was producing a first polyolefin at the first concentration to produce a second polyolefin at the second catalyst concentration that has a different density and molecular weight. The polyolefin particles discharged from the reactor can consequently have a density and molecular weight distribution that is different than desired due to the presence of the second polyolefin in the discharged mass of polyolefin particles. Thus, the concentration of the catalyst in the reactors should be kept as steady as possible, and there is an ongoing need for improving the control of catalyst concentration in the reactors.

SUMMARY

Disclosed herein is a process comprising preparing a catalyst slurry comprising a solid particulate catalyst and a carrier liquid in a catalyst slurry preparation system. The catalyst slurry can be prepared in a first mixing vessel or a second mixing vessel that is upstream of the first mixing vessel. Alternatively, a first catalyst slurry is prepared in the first mixing vessel and a second catalyst slurry is prepared in the second mixing vessel that is upstream of the first mixing vessel, the first catalyst slurry differing from the second catalyst slurry by the concentration of catalyst in the respective slurry.

Also disclosed is the catalyst slurry preparation system, which can include a mixing vessel, a rotatable impeller system connected to the mixing vessel, and a motor connected to the rotatable impeller system. The rotatable impeller system can include an agitator shaft and a first hub connected to the agitator shaft, wherein the first hub and at least a portion of the agitator shaft are positioned within the mixing vessel along a longitudinal axis of the mixing vessel, and wherein the first hub comprises at least three blades. The rotatable impeller system can also include one or more additional hubs connected to the agitator shaft below the first hub. The additional hub(s) can each have two or more blades. The system can also include the catalyst slurry in the mixing vessel and can be configured to mix the catalyst slurry in the mixing vessel.

Also disclosed is another catalyst slurry preparation system, which can include 1) a first mixing vessel, a first rotatable impeller system connected to the first mixing vessel, and a first motor connected to the first rotatable impeller system, and 2) a second mixing vessel, a second rotatable impeller system connected to the second mixing vessel, and a second motor connected to the second rotatable impeller system. The first and second rotatable impeller systems can each include an agitator shaft and a first hub connected to the agitator shaft, wherein the first hub and at least a portion of the agitator shaft are positioned within the respective mixing vessel along a longitudinal axis of the respective mixing vessel, and wherein the first hub comprises at least three blades. The first and/or second rotatable impeller system can also include one or more additional hubs connected to the agitator shaft below the first hub. The additional hub(s) can each have two or more blades. The catalyst slurry preparation system can also include a catalyst slurry in the mixing vessels and can be configured to mix the catalyst slurry in the mixing vessels; or the catalyst slurry preparation system can also include a first catalyst slurry in the first mixing vessel and a second catalyst slurry in the second mixing vessel, where each mixing vessel is configured to mix the respective catalyst slurry contained therein.

BRIEF DESCRIPTION OF THE DRAWINGS

The following figures form part of the present specification and are included to further demonstrate certain aspects of the present invention. The invention may be better understood by reference to one or more of these figures in combination with the detailed description of specific embodiments presented herein.

FIGS. 3A to 3H illustrate cross sectional views of a mixing vessel having different configurations of hubs contemplated by the disclosure.

Figure 1:
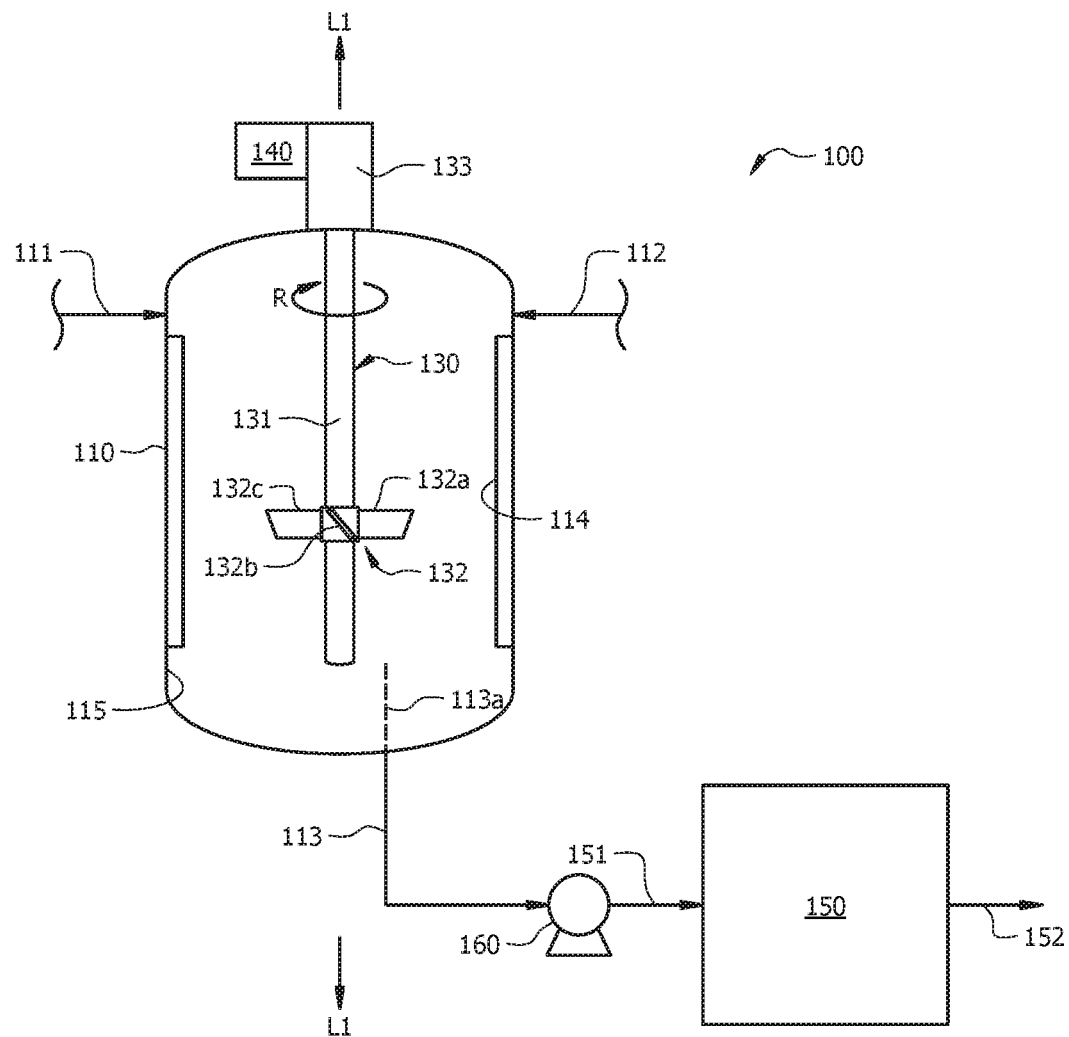
FIG. 1 illustrates a process flow diagram of an embodiment of the disclosed catalyst slurry preparation system, with the mixing vessel in a cross-sectional view.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The figures described above and the written description of specific structures and functions below are not presented to limit the scope of what Applicant has invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the figures and are not intended to limit the scope of the invention or the appended claims.

The terms "configured to", "configured for use", "adapted for use", and similar language is used herein to reflect that the particular recited structure or procedure is used in the disclosed system or process. For example, unless otherwise specified, a particular structure "configured for use" means it is "configured for use in catalyst slurry preparation system" and therefore is designed, shaped, arranged, constructed, and/or tailored to prepare a catalyst slurry, as would have been understood by the skilled person.

The terms "conduit" and "line" are interchangeable, and as used herein, refer to a physical structure configured for the flow of materials therethrough, such as pipe or tubing. The materials that flow in the "conduit" or "line can be in the gas phase, the liquid phase, the solid phase, or a combination of these phases.

The term "stream" as used herein refers to a physical composition of materials that flow through a "conduit" or "line".

The term "catalyst slurry" as used herein refers to a composition comprising solid catalyst particles and a carrier liquid (e.g., a liquid diluent).

The term "pitch angle" as used herein refers to the angle between the center plane of a blade and vertical.

The term "diameter" with respect to a hub described herein is the diameter of the circle formed by the circumference of rotation of the blades of the hub.

Disclosed herein are a process and system for preparing a catalyst slurry for use in one or more polymerization reactors. Polymerization of olefins involves the polymerization of olefin monomer in a reactor in the presence of a polymerization catalyst. Suitable catalysts for the preparation of polyolefin include chromium-containing catalysts, Ziegler-Natta catalysts, and metallocene catalysts. When the catalyst is used in particulate form, the catalyst can be mixed with a carrying fluid (e.g., liquid diluent), forming a catalyst slurry, and the catalyst slurry can be subsequently introduced to a polymerization reactor. Concentration gradients and/or pockets of higher or lower catalyst concentrations in the mixing vessel for the catalyst slurry can lead to variances in the concentration of catalyst that is fed to the polymerization reactor, which makes controlling the temperature of the reactor more difficult since higher than desired catalyst concentrations cause more exothermic polymerization reactions to occur (leading to an increase in reactor temperature) and lower than desired catalyst concentrations cause fewer exothermic polymerization reactions to occur (leading to a decrease in reactor temperature). Because properties of the formed polyolefin depend on conditions in the polymerization reactor, including the concentration of catalyst in the reactor and the temperature of polymerization reactions, the disclosed process and system is configured to improve mixing of a catalyst slurry that is subsequently introduced to the polymerization reactor so that the concentration of the catalyst in the reactor can be maintained around a desired value for the entire duration of a polymerization run. It is believed that a hub having at least three blades in combination with other aspects of the disclosed process and system leads to further ability to maintain the concentration of the catalyst in the reactor around a desired value for the entire duration of a polymerization run.

It has been found that including at least one hub having three or more blades in the disclosed catalyst preparation process and system improves the mixing of the catalyst slurry, compared to catalyst preparation processes and systems that utilize hub(s) having only two blades. That is, utilizing at least one hub having three or more blades reduces settling of the catalyst out of the slurry prior to introduction to a polymerization reactor and improves over longer periods of time the homogeneity of the catalyst slurry that is introduced into a polymerization reactor. The configuration, spacing, and size of additional hubs also provide advantages in catalyst slurry mixing, as explained herein. Finally, other aspects of the system and process provide advantages, including the sequence of mixing vessels, concentration of catalyst in the mixing vessels, location of outlet conduits for the mixing vessels, contour of the hubs, the number of blades on the hubs, and the pitch of the blades.

Turning now to the figures, FIG. 1 illustrates a process flow diagram of an embodiment of the disclosed catalyst slurry preparation system 100, with the mixing vessel 110 in a cross-sectional view. As can be seen, the catalyst slurry preparation system 100 can include a mixing vessel 110, a rotatable impeller system 130 connected to the mixing vessel 110, and a motor 140 connected to the rotatable impeller system 130. The catalyst slurry preparation system 100 can further include a polymerization reactor 150 that is fluidly coupled to the mixing vessel 110.

The mixing vessel 110 can be any vessel that is suitable for mixing slurries, and particularly, for mixing catalyst slurries that are used in the polymerization of olefin, e.g., for introduction to a loop slurry reactor or a gas phase reactor. The mixing vessel 110 can generally be cylindrical in shape. The top and bottom of the mixing vessel 110 can be flat, or can have a contour that is appropriate for holding pressurized contents, e.g., at a pressure suitable for coupling with a polymerization reactor. In some aspects, the height to diameter ratio of the mixing vessel 110 can be in a range of about 1 to about 5; alternatively, about 1 to about 4; alternatively, about 1 to about 3; alternatively, about 1.5 to about 2.5; alternatively, about 2. In some aspects, the height of the mixing vessel 110 can be 5-20 feet; alternatively, or 8-12 feet; or alternatively, 9-10 feet as measured tangent to tangent. In some aspects, the diameter of the mixing vessel 110 can be 2-20 feet; alternatively, 3-12 feet; alternatively, 4-10 feet; alternatively, 4-5 feet; or alternatively, 9-10 feet.

The mixing vessel can include an inlet conduit 111, an optional second inlet conduit 112, and an outlet conduit 113. In aspects where the catalyst slurry is prepared ex-situ of the mixing vessel 110, the inlet conduit 111 can be configured to introduce a catalyst slurry into the mixing vessel 110. In aspects where the catalyst slurry is prepared in-situ of the mixing vessel 110, the inlet conduit 111 can be configured to introduce solid catalyst particles into the mixing vessel 110, and the second inlet conduit 112 can be configured to introduce the carrier liquid into the mixing vessel 110. In such aspects, the inlet conduit 111 can be fluidly connected to a lock hopper that contains solid catalyst particles that are introduced into the mixing vessel 110 via the inlet conduit 111. The outlet conduit 113 (also can be referred to as take-off conduit) is shown in FIG. 1 connected to and extending through the inner wall 115 on the bottom of the mixing vessel 110. In alternative aspects, it is contemplated that the outlet conduit 113 can be connected to and extend through the inner wall 115 at any location on the lower half of the mixing vessel 110. A portion 113a of the outlet conduit 113 is configured to extend into the interior of the mixing vessel 110 so that catalyst slurry take-off is not near the inner wall 115 of the mixing vessel 110. The portion 113a is shown in FIG. 1 as extending vertically; however, it is contemplated that in alternative configurations, the portion 113a can extend at an angle less than 90° relative to vertical through the inner wall 115 on the bottom of the mixing vessel 110; alternatively, the portion 113a can extend through the inner wall 115 on a side of the mixing vessel 110 horizontally or at an angle less than 90° relative to horizontal. Also, the portion 113a is shown in FIG. 1 as extending into the mixing vessel 110 off-center of the longitudinal axis L1 of the mixing vessel 110.

The solids catalyst particles can be of any catalyst known for polymerization of olefins in loop slurry reactors and gas phase reactors, such as a chromium-containing catalyst, a Ziegler-Natta catalyst, or a metallocene catalyst. The catalyst can have any productivity defined as mass per mass of catalyst or polymer per mass of catalyst. Non-limiting example values for catalyst productivity include catalyst productivity values that are greater than 1,000, 10,000, 20,000, 50,000, or 100,000. In some aspects, the catalyst can include a pre-polymer. Examples of the pre-polymer include polyethylene, polypropylene, or any other polyolefin. The pre-polymer to raw catalyst weight ratio can be 0.1-20, alternatively 1-10, or alternatively 3-8.

Suitable carrier liquids for the catalyst slurry include hydrocarbons which are inert diluents and in liquid phase under feed and polymerization conditions or are super critical fluids under slurry polymerization conditions. Suitable liquid diluents include hydrocarbons such as aliphatic, cycloaliphatic, and aromatic hydrocarbons. For example, suitable liquid diluents include $C_{12}$ or lower, straight chain or branched chain, saturated hydrocarbons, $C_5$ to $C_9$ saturated alicyclic or aromatic hydrocarbons or $C_2$ to $C_6$ halogenated hydrocarbons. Specific examples include propane, n-butane, isobutane, n-pentane, isopentane, neopentane, n-hexane, n-heptane, cyclopentane, cyclohexane, cycloheptane, methyl cyclopentane, methyl cyclohexane, isooctane, benzene, toluene, xylene, or a combination thereof. Suitable carrier liquid may include halogenated hydrocarbons, including $C_{12}$ or lower, straight chain or branched chain, saturated hydrocarbons, $C_5$ to $C_9$ saturated alicyclic or aromatic hydrocarbons, or $C_2$ to $C_6$ halogenated hydrocarbons. Specific examples of halogenated hydrocarbons include chloroform, chlorobenzenes, tetrachloroethylene, dichloroethane and trichloroethane.

In some aspects, the mixing vessel 110 can be configured to operate in a liquid full mode, which means that in operation, the mixing vessel 110 is completely filled with a catalyst slurry and is essentially free of a gaseous phase. The liquid full mode includes aspects where a gas phase is present in the mixing vessel 110 in an amount that is less than or equal to about 5%, about 4%, about 3%, about 2%, about 1%, about 0.5%, about 0.1%, or 0% by volume based on a volume of the mixing vessel 110. The liquid full mode can also include aspects where the catalyst slurry is present in the mixing vessel 110 in an amount that is greater than about 95%, 96%, 97%, 98%, 99%, 99.5%, 99.9%, or 100% by volume based on a volume of the mixing vessel 110. In liquid full mode of operation, catalyst and carrier liquid can be introduced into the mixing vessel 110 via conduits 111 and 112 when the volume of catalyst slurry in the mixing vessel 110 drops below about 99.9%, 99.5%, 99%, 98%, 97%, 96%, or 95% by volume based on a volume of the mixing vessel 110.

In other aspects, the mixing vessel 110 can be configured with a level control system that is configured to introduce catalyst and carrier liquid via conduits 111 and 112 at periodic intervals of time, or when the level of catalyst slurry in the mixing vessel 110 falls below a threshold level, for example, when the volume of catalyst slurry drops below 50%, 40%, 30%, or 20% by volume based on a volume of the mixing vessel 110.

In aspects, the mixing vessel 110 can be configured to hold a volume of the catalyst slurry that is suitable to feed the catalyst slurry to the polymerization reactor 150 for a time period in a range of from about 12 to about 72 hours. In further aspects, the volume of the mixing vessel 110 can be at least 200 l (liters); alternatively, at least 400 l; alternatively, at least 450 l; additionally or alternatively, less than or equal to 2000 l; additionally or alternatively, less than or equal to 1000 l; additionally or alternatively, less than or equal to 600 l; additionally or alternatively, less than or equal to 550 l; additionally or alternatively, less than or equal to about 500 l; additionally or alternatively, about 500 l.

In aspects, the mixing vessel 110 of the catalyst slurry preparation system 100 can include one or more baffle(s) 114, wherein each baffle 114 is fixed longitudinally along and extends radially inward from the inner wall 115 of the mixing vessel 110. Each baffle 114 can extend along the inner wall 115 of the mixing vessel 110 for at least two-thirds of the height of the mixing vessel 110. As used herein, a baffle 114 can be a flat solid material or flat screen that is configured to deflect or disrupt the flow of catalyst slurry along the inner wall 115 of the mixing vessel 110, e.g., to create turbulence in the catalyst slurry in the mixing vessel 110. In some aspects, each baffle 114 can extend radially inward from the inner wall 115 of the mixing vessel 110 for a distance of in a range of about 5% to about 20%, alternatively, about 10% and about 20%, alternatively, about 5% and about 15% of the diameter of the mixing vessel 110.

In aspects, the mixing vessel 110 can be configured to maintain the catalyst slurry at a temperature in a range of about 75° F. to about 125° F. (about 23.8° C. to about 51.7° C.); alternatively, in a range of about 85° F. to about 115° F. (about 29.4° C. to about 46.1° C.); alternatively, in a range of about 95° F. to about 105° F. (about 35° C. to about 40.6° C.); alternatively, of about 100° F. (about 37.7° C.).

In aspects, the mixing vessel 110 can be configured to maintain the catalyst slurry at a pressure in a range of about 0 psig to about 300 psig (about 0 MPag to about 2.07 MPag); alternatively, in a range of about 0 psig to about 200 psig (about 0 MPag to about 1.38 MPag).

The rotatable impeller system 130 can include an agitator shaft 131 and a hub 132 connected to the agitator shaft 131. Generally, the hub 132 and at least a portion of the agitator shaft 131 are positioned within the mixing vessel 110 along a longitudinal axis L1-L1 of the mixing vessel 110. The length of the agitator shaft 131 that is inside the mixing vessel 110 can be in a range of from about 75% to about 95% of the height of the mixing vessel 110. In FIG. 1, it can be seen that the hub 132 has three blades 132a, 132b, and 132c. In some embodiments, the hub 132 can have more than three blades, e.g., four blades, five blades, or six blades. In FIG. 1, the hub 132 is illustrated as being connected to the agitator shaft 131 in the lower half of the mixing vessel 110; however, in other aspects, the hub 132 can be connected to the agitator shaft 131 in the upper half of the mixing vessel 110, in an upper portion of the mixing vessel 110, in a middle portion of the mixing vessel 110, or in a lower portion of the mixing vessel 110.

The rotatable impeller system 130 can additionally include an agitator bearing unit 133 having magnetic elements. The agitator bearing unit 133 can be connected to the motor 140. In operation, the motor 140 can generate energy which is translated by the agitator bearing unit 133 into a rotation of the agitator shaft 131 in the direction of arrow R. The blades 132a, 132b, and 132c of the hub 132 (and the blades of any other hub connected to the agitator shaft 131), in turn, rotate with the rotation of the agitator shaft 131.

In aspects, the rotatable impeller system 130 (e.g., the agitator shaft 131 and any hub connected thereof) can be rotatable at a speed in a range of from 1 to 10,000 rpm.

As described above, the motor 140 can be configured to generate energy which is translated by the agitator bearing unit 133 into a rotation of the agitator shaft 131. In aspects, the motor 140 can be an electric motor which drives an adjustable magnetic coupling between the agitator bearing unit 133 and the agitator shaft 131 to transfer torque to the agitation shaft 131. In aspects, the motor 140 can have 2, 4, 8, 12, or 16 poles. In alternative or additional aspects, the motor 140 can be configured to operate at 50 Hz or 60 Hz. In alternative or additional aspects, the motor 140 can be configured to operate under no load conditions of 900, 1200, 1500, 1800, 3000, or 3600 rpm.

The polymerization reactor 150 can be embodied as one or more polymerization reactors, e.g., one or more loop slurry reactors, one or more fluidized bed reactors, one or more autoclave reactors, one or more tubular reactors, one or more horizontal gas phase reactors, one or more continuous stirred-tank reactors, one or more solution reactors, or a combination thereof. For example, in some aspects the polymerization reactor 150 can be two loop reactors, two or three continuous stirred tank reactors, or at least one loop reactor in series with at least one gas phase reactor. The gas phase reactor can be a fluidized bed or horizontal reactor. Configurations for these types of polymerization reactors are known, each capable of producing a polyolefin by contacting an olefin monomer with a catalyst slurry that is introduced via the disclosed catalyst slurry preparation system 100. In aspects where the polymerization reactor 150 is more than one reactor, the reactors can be configured to operate in parallel or in series. In aspects, the production of each reactor of the polymerization reactor 150 can be greater than 20,000, 50,000, 100,000, 200,000, 300,000, or 500,000 lb/hr. The scope of the inventive subject matter is not limited by the reactor or reactor system production rate. The olefin monomer can be ethylene or propylene, and the polyolefin can be polyethylene or polypropylene. The polymerization reactor 150 generally has an inlet conduit 151 and a product discharge conduit 152. Polymerization product containing the polyolefin can flow from the polymerization reactor 150 via product discharge conduit 152 to a product separation system, which can be of any configuration known in the art. The polyolefin can be a high density polyethylene, a linear low density polyethylene, a medium density polyethylene, a multimodal polyethylene, a block copolymer, a homopolymer, a copolymer, or a combination thereof.

In some aspects, a pump 160 can connect to the outlet conduit 113 of the mixing vessel 110 and to the inlet conduit 151 of the polymerization reactor 150. The pump 160 can be configured to control the flow of the catalyst slurry to the reactor 150. In aspects, controlling flow by the pump 160 can include feeding the catalyst slurry received from outlet conduit 113 under a pressure suitable for introduction into the polymerization reactor 150 via conduit 151. Suitable pressures for the catalyst slurry in conduit 151 include any pressure that is higher than the pressure in the polymerization reactor 150.

In aspects, the concentration of catalyst in the catalyst slurry in the mixing vessel 110 in FIG. 1 can be greater than 0.0, 0.1, 0.2, 0.3, 0.4, or 0.5 wt % and less than 20, 15, 12, 10, 9, 8, 7, 6, 5, 4, or 3 wt % based on a total weight of the catalyst slurry in the mixing vessel 110. In particular aspects, the concentration of chromium-containing catalyst in the catalyst slurry of the mixing vessel 110 of FIG. 1 can be greater than 5, 6, 7, or 8 wt % and less than 20, 19, 18, 17, 16, or 15 wt % based on a total weight of the catalyst slurry in the mixing vessel 110. In other particular aspects, the concentration of Ziegler-Natta catalyst or metallocene catalyst in the catalyst slurry of the mixing vessel 110 can be greater than 0.0, 0.1, 0.2, 0.3, 0.4, or 0.5 wt % and less than 5, 4, or 3 wt % based on a total weight of the catalyst slurry in the mixing vessel 110.

In aspects, the hub 132 comprising three blades 132a, 132b, and 132c enables the catalyst slurry preparation system 100 to have a value for the Coefficient of Variation (CoV) at one or more cross sections of the mixing vessel 110 that is indicative of a well-mixed catalyst slurry in the mixing vessel 110. The CoV describes the deviation of a local concentration of the catalyst slurry in the mixing vessel 110 from the mean concentration within one or more cross sections of the mixing vessel 110. The Coefficient of Variation (CoV) for the catalyst slurry concentration in the mixing vessel 110 of catalyst slurry preparation system 100, as used herein, is defined in Formula (1) as:

$$CoV = \left[\frac{\sum_{i=1}^{n}(c_i - c_{avg})^2}{n-1}\right]^{0.5} \frac{1}{c_{mean}} \quad (1)$$

where $C_i$ is sample concentration of catalyst in the catalyst slurry taken at a first sampling location in the mixing vessel 110, $C_{avg}$ is the average concentration of catalyst in the catalyst slurry in all samples taken at all sampling locations in the mixing vessel 110, $C_{mean}$ is the mean concentration of catalyst in the catalyst slurry in all samples taken at the first sampling location in the mixing vessel 110, and n=number of locations where the catalyst slurry samples are taken. The presence of the hub 132 having at least three blades (e.g., blades 132a, 132b, and 132c) advantageously provides for a CoV value in the mixing vessel 110 of the catalyst slurry preparation system 100 that is less than about 0.4, 0.3, 0.2, 0.1, 0.05, or 0.01.

Figure 2:
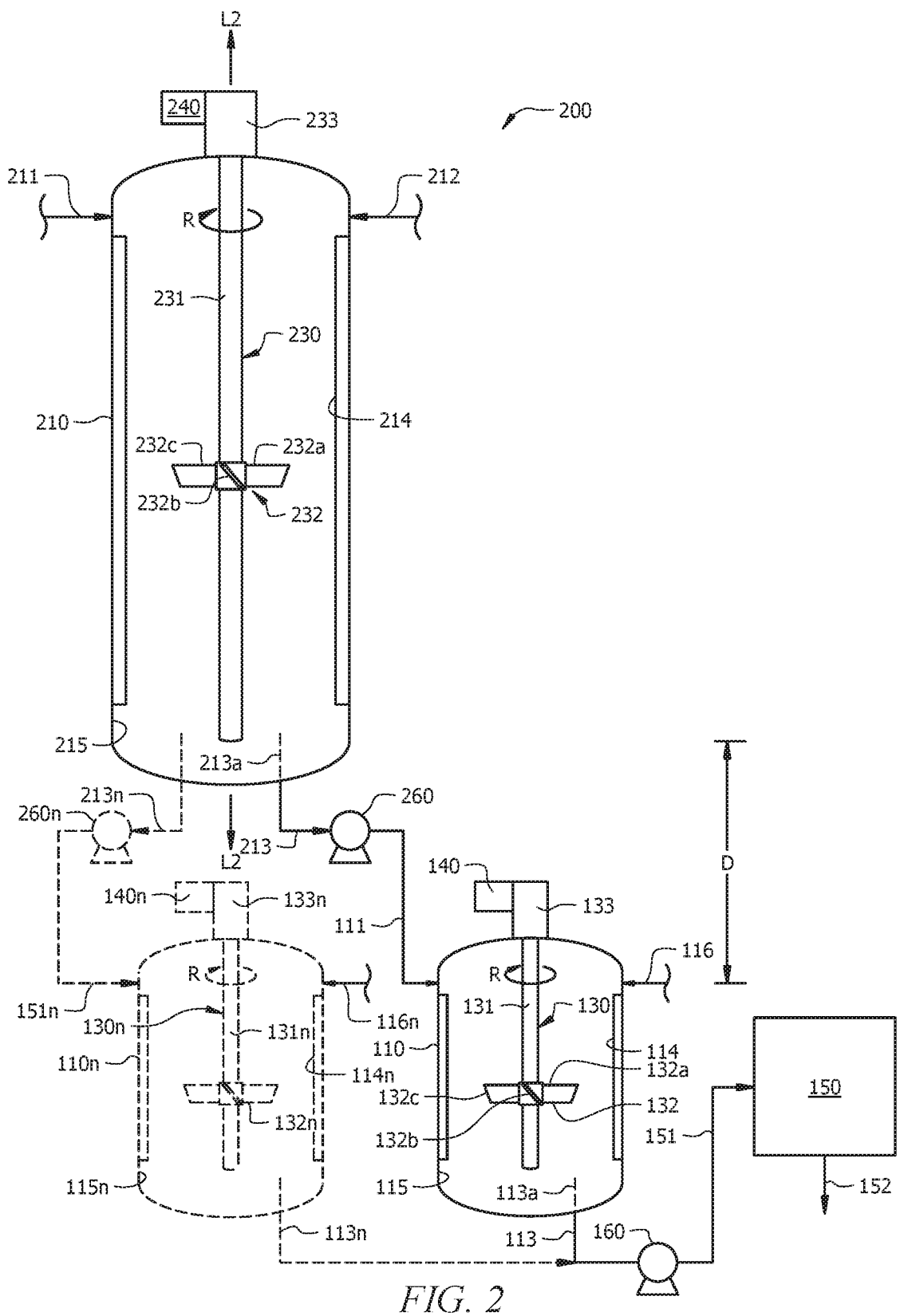
FIG. 2 illustrates a process flow diagram of another embodiment of the disclosed catalyst slurry preparation system, with the mixing vessels in a cross-sectional view.

FIG. 2 illustrates a process flow diagram of another embodiment of the disclosed catalyst slurry preparation system 200, with the mixing vessels 110 and 210 in a cross-sectional view. A cross-sectional view of an optional mixing vessel 110n is also illustrated in FIG. 2 in dashed lines, representing one of any number "n" of mixing vessels 110n that can be connected in parallel to the mixing vessel 110. The mixing vessel 110 of the catalyst slurry preparation system 100 can be the same in system 200 as described for the system 100 in FIG. 1, except in FIG. 2, the inlet conduit 111 is coupled to the outlet conduit 213 of the mixing vessel 210 and thus is configured to receive a catalyst slurry, and an optional carrier liquid conduit 116 is configured to introduce fresh carrier fluid (e.g., carrier fluid that is not already mixed with the catalyst slurry) into the mixing vessel 110 if needed (e.g., to dilute the concentration of catalyst in the catalyst slurry, to wash the mixing vessel 110, etc.). Also, the polymerization reactor 150 and the coupling of the polymerization reactor 150 to the mixing vessel 110 is the same in system 200 as described for the system 100 in FIG. 1. The optional mixing vessel 110*n* of FIG. 2 can be the same in system 200 as described for the mixing vessel 110 in the system 100 in FIG. 1, with similar parts of mixing vessel 110*n* designated with "n" after the reference numeral. As can be seen in FIG. 2, the optional additional mixing vessel 110*n* is connected to the mixing vessel 210 in parallel with the mixing vessel 110 via a separate outlet conduit 213*n* of the mixing vessel 210, and the outlet conduit 113*n* of the mixing vessel 110*n* can connect with the outlet conduit 113 of the mixing vessel 110. In FIG. 2, mixing vessel 110 and mixing vessel 110*n* can each have a hub 132/132*n* having at least three blades. Configurations of hub 132 (and thus of hub 132*n*), configurations of hub 232, as well as configurations of additional hubs are discussed in FIGS. 3A to 3H, 4A to 4D, 5A to 5D, and 6A to 6D.

The mixing vessel 210 of catalyst slurry preparation system 200 in FIG. 2 can be any vessel that is suitable for mixing slurries, and particularly, for mixing catalyst slurries that are used in the polymerization of olefin, e.g., for introduction to a loop slurry reactor or a gas phase reactor. The mixing vessel 210 can generally be cylindrical in shape. The top and bottom of the mixing vessel 210 can be flat, or can have a contour that is appropriate for holding pressurized contents, e.g., at a pressure suitable for coupling with a polymerization reactor. In some aspects, the height to diameter ratio of the mixing vessel 210 can be in a range of about 1 to about 5; alternatively, about 1 to about 4; alternatively, about 1 to about 3; alternatively, about 1.5 to about 2.5; alternatively, about 2. In some aspects, the height of the mixing vessel 210 can be 5-20 feet; alternatively, or 8-12 feet; or alternatively, 9-10 feet as measured tangent to tangent. In some aspects, the diameter of the mixing vessel 110 can be 2-20 feet; alternatively, 3-12 feet; alternatively, 4-10 feet; alternatively, 4-5 feet; or alternatively, 9-10 feet.

The mixing vessel can include an inlet conduit 211, a second inlet conduit 212, and an outlet conduit 213. The inlet conduit 211 can be configured to introduce solid catalyst particles into the mixing vessel 210, and the second inlet conduit 212 can be configured to introduce the carrier liquid into the mixing vessel 210 such that a catalyst slurry is produced in-situ of the mixing vessel 210 (in such embodiments, the catalyst slurry is produced ex-situ of the mixing vessel 110). In some aspects, the inlet conduit 211 can be fluidly connected to a lock hopper that contains solid catalyst particles that are introduced into the mixing vessel 210 via the inlet conduit 211. The outlet conduit 213 (also can be referred to as take-off conduit) is shown in FIG. 2 connected to and extending through the inner wall 215 on the bottom of the mixing vessel 210; however, it is contemplated that the outlet conduit 213 can be connected to and extend through the inner wall 215 at any location on the lower half of the mixing vessel 210. A portion 213*a* of the outlet conduit 213 is configured to extend into the interior of the mixing vessel 210 so that catalyst slurry take-off is not near the inner wall 215 of the mixing vessel 210. The portion 213*a* is shown in FIG. 2 as extending vertically; however, it is contemplated that in alternative configurations, the portion 213*a* can extend at an angle less than 90° relative to vertical through the inner wall 215 on the bottom of the mixing vessel 210; alternatively, the portion 213*a* can extend through the inner wall 215 on a side of the mixing vessel 210 horizontally or at an angle less than 90° relative to horizontal.

In some aspects, the mixing vessel 210 can be configured to operate in a liquid full mode, which means that in operation, the mixing vessel 210 is completely filled with a catalyst slurry and is essentially free of a gaseous phase. The liquid full mode includes aspects where a gas phase is present in the mixing vessel 210 in an amount that is less than or equal to about 5%, about 4%, about 3%, about 2%, about 1%, about 0.5%, about 0.1%, or 0% by volume based on a volume of the mixing vessel 210. The liquid full mode can also include aspects where the catalyst slurry is present in the mixing vessel 210 in an amount that is greater than about 95%, 96%, 97%, 98%, 99%, 99.5%, 99.9%, or 100% by volume based on a volume of the mixing vessel 210.

In aspects, the volume of the mixing vessel 210 can be about four to eight time the volume of the mixing vessel 110. In further aspects, the mixing vessel 210 can be configured to hold a volume of catalyst slurry that is four to eight times the volume of catalyst slurry that is held by the mixing vessel 110. In some aspects, the volume of the mixing vessel 210 can be at least 800 l (liters); alternatively, at least 1600 l; alternatively, at least 1800 l; alternatively, at least 3200 l; alternatively, at least 3600 l; additionally or alternatively, less than or equal to 16000 l; additionally or alternatively, less than or equal to 8000 l; additionally or alternatively, less than or equal to 4800 l; additionally or alternatively, less than or equal to 4400 l; additionally or alternatively, less than or equal to 4000 l; additionally or alternatively, less than or equal to 2400 l; additionally or alternatively, less than or equal to 2200 l; additionally or alternatively, less than or equal to about 2000 l; alternatively, about 4000 l; alternatively, about 3000 l; alternatively, about 2000 l.

In aspects, the mixing vessel 210 can be configured to maintain the catalyst slurry at a temperature in a range of about 75° F. to about 125° F. (about 23.8° C. to about 51.7° C.); alternatively, in a range of about 85° F. to about 115° F. (about 29.4° C. to about 46.1° C.); alternatively, in a range of about 95° F. to about 105° F. (about 35° C. to about 40.6° C.); alternatively, of about 100° F. (about 37.7° C.).

In aspects, the mixing vessel 210 can be configured to maintain the catalyst slurry at a pressure in a range of about 0 psig to about 300 psig (about 0 MPag to about 2.07 MPag); alternatively, in a range of about 0 psig to about 200 psig (about 0 MPag to about 1.38 MPag).

In aspects, the mixing vessel 210 of the catalyst slurry preparation system 200 can include one or more baffle(s) 214, wherein each baffle 214 is fixed longitudinally along and extends radially inward from the inner wall 215 of the mixing vessel 210. Each baffle 214 can extend along the inner wall 215 of the mixing vessel 210 for at least two-thirds of the height of the mixing vessel 210. As used herein, a baffle 214 can be a flat solid material or flat screen that is configured to deflect or disrupt the flow of catalyst slurry in the mixing vessel 210, e.g., to create turbulence in the catalyst slurry in the mixing vessel 210. In some aspects, each baffle 214 can extend radially inward from the inner wall 215 of the mixing vessel 210 for a distance of in a range of about 5% to about 20%, alternatively, about 10% and about 20%, alternatively, about 5% and about 15% of the diameter of the mixing vessel 110.

The rotatable impeller system 230 of the catalyst slurry preparation system 200 can include an agitator shaft 231 and a hub 232 connected to the agitator shaft 231. Generally, the hub 232 and at least a portion of the agitator shaft 231 are positioned within the mixing vessel 210 along a longitudinal axis L2-L2 of the mixing vessel 210. The length of the agitator shaft 231 that is inside the mixing vessel 210 can be in a range of from about 75% to about 95% of the height of the mixing vessel 110. In FIG. 2, it can be seen that the hub 232 has three blades 232a, 232b, and 232c. In some embodiments, the hub 232 can have more than three blades, e.g., four blades, five blades, or six blades. In FIG. 2, the hub 232 is illustrated as being connected to the agitator shaft 231 in the lower half of the mixing vessel 210; however, in other aspects, the hub 232 can be connected to the agitator shaft 231 in the upper half of the mixing vessel 210, in an upper portion of the mixing vessel 210, in a middle portion of the mixing vessel 210, or in a lower portion of the mixing vessel 210.

The rotatable impeller system 230 can additionally include an agitator bearing unit 233 having magnetic elements. The agitator bearing unit 233 can be connected to the motor 240. In operation, the motor 240 can generate energy which is translated by the agitator bearing unit 233 into a rotation of the agitator shaft 231. The blades 232a, 232b, and 232c of the hub 232 (and the blades of any other hub connected to the agitator shaft 231), in turn, rotate with the rotation of the agitator shaft 231.

In aspects, the rotatable impeller system 230 (e.g., the agitator shaft 231 and any hub connected thereof) can be rotatable at a speed in a range of from 1 to 10,000 rpm.

As described above, the motor 240 can be configured to generate energy which is translated by the agitator bearing unit 233 into a rotation of the agitator shaft 231. In aspects, the motor 240 can be an electric motor which drives an adjustable magnetic coupling between the agitator bearing unit 233 and the agitator shaft 231 to transfer torque to the agitation shaft 231. In aspects, the motor 240 can have 2, 4, 8, 12, or 16 poles. In alternative or additional aspects, the motor 240 can be configured to operate at 50 Hz or 60 Hz. In alternative or additional aspects, the motor 240 can be configured to operate under no load conditions of 900, 1200, 1500, 1800, 3000, or 3600 rpm.

In the catalyst slurry preparation system 200, the value for the concentration of catalyst in the catalyst slurry in the mixing vessel 110 can be about equal to, greater than, or less than the concentration of the catalyst in the catalyst slurry in the mixing vessel 210. In some aspects, "about equal to" can mean that the value for the concentration of catalyst in the catalyst slurry in the mixing vessel 110 can be within +/−1 wt % the value for the concentration of catalyst in the catalyst slurry in the mixing vessel 210.

In aspects where the concentration of catalyst in the catalyst slurry in the mixing vessel 110 is about equal to the concentration of catalyst in the catalyst slurry of the mixing vessel 210, the volume of the mixing vessel 110 can be suitable to hold a volume suitable to feed the catalyst slurry to the polymerization reactor 150 for about 1, 2, 3, 4, 5, 6, 7, 8, 9, 10, 11, or 12 hours, and the volume of the mixing vessel 210 can be four to eight times the volume of catalyst slurry that is held by the mixing vessel 110. The catalyst slurry in the mixing vessel 210 can be used to replenish the catalyst slurry in the mixing vessel 110 at periodic intervals of time, or when the level of catalyst slurry in the mixing vessel 110 falls below a threshold level, for example, when the volume of catalyst slurry drops below 50%, 40%, 30%, or 20% by volume based on a volume of the mixing vessel 110.

In aspects, the concentration of catalyst in the catalyst slurry of the mixing vessel 110 and/or the mixing vessel 210 can be greater than 0.0, 0.1, 0.2, 0.3, 0.4, or 0.5 wt % based on a total weight of the catalyst slurry in the respective mixing vessel; additionally or alternatively, the concentration of catalyst in the catalyst slurry of the mixing vessel 110 and/or the mixing vessel 210 can be less than 20, 15, 12, 10, 9, 8, 7, 6, 5, 4, or 3 wt % based on a total weight of the catalyst slurry in the respective mixing vessel. The catalyst might or might not comprise a pre-polymer. In aspects, the concentration of chromium-containing catalyst in the catalyst slurry of the mixing vessel 110 and/or the mixing vessel 210 can be greater than 5, 6, 7, or 8 wt % based on a total weight of the catalyst slurry in the respective mixing vessel; additionally or alternatively, the concentration of chromium-containing catalyst in the catalyst slurry of the mixing vessel 110 and/or the mixing vessel 210 can be less than 20, 19, 18, 17, 16, or 15 wt % based on a total weight of the catalyst slurry in the respective mixing vessel. In other aspects, the concentration of Ziegler-Natta catalyst or metallocene catalyst in the catalyst slurry of the mixing vessel 110 and/or the mixing vessel 210 can be greater than 0.0, 0.1, 0.2, 0.3, 0.4, or 0.5 wt % based on a total weight of the catalyst slurry in the respective mixing vessel; additionally or alternatively, the concentration of Ziegler-Natta catalyst or metallocene catalyst in the catalyst slurry of the mixing vessel 110 and/or the mixing vessel 210 can be less than 5, 4, or 3 wt % based on a total weight of the catalyst slurry in the respective mixing vessel.

In other aspects, the concentration of the catalyst in the catalyst slurry in the mixing vessel 110 can be less than the concentration of catalyst in the catalyst slurry of the mixing vessel 210. That is, the catalyst slurry in the mixing vessel 210 can be a concentrated catalyst slurry having a concentration of catalyst greater than 10, 12, 15, or 20 wt % based on a total weight of the catalyst slurry in the mixing vessel 210, and the concentration of catalyst in the catalyst slurry in the mixing vessel 110 can be greater than 0.0, 0.1, 0.2, 0.3, 0.4, or 0.5 wt % and less than 20, 15, 12, 10, 9, 8, 7, 6, 5, 4, or 3 wt % based on a total weight of the catalyst slurry in the mixing vessel 110. For example, the concentration of catalyst in the catalyst slurry in the mixing vessel 210 can be greater than 10, 12, 15, or 20 wt % based on a total weight of the catalyst slurry in the mixing vessel 210, and the concentration of chromium-containing catalyst in the catalyst slurry of the mixing vessel 110 is less than the concentration in the mixing vessel 210 and can be greater than 5, 6, 7, or 8 wt % and less than 20, 19, 18, 17, 16, or 15 wt % based on a total weight of the catalyst slurry in the mixing vessel 110. In another example, the concentration of catalyst in the catalyst slurry in the mixing vessel 210 can be greater than 3, 4, or 5 wt % based on a total weight of the catalyst slurry in the mixing vessel 210, and the concentration of Ziegler-Natta catalyst or metallocene catalyst in the catalyst slurry of the mixing vessel 110 is less than the concentration in the mixing vessel 210 and can be greater than 0.0, 0.1, 0.2, 0.3, 0.4, or 0.5 wt % and less than 5, 4, or 3 wt % based on a total weight of the catalyst slurry in the mixing vessel 110). In such aspects, the mixing vessel 210 can be a "mud pot" as is known in the industry, and the carrier liquid inlet conduit 116 connected to the mixing vessel 110 can be used to dilute the catalyst slurry introduced from the mixing vessel 210 ("mud pot") to produce a second catalyst slurry in the mixing vessel 110 having a catalyst concentration (any concentration described for mixing vessel 110 herein) that is suitable for introduction to the polymerization reactor 150.

In aspects, the hub 132 comprising three blades 132a, 132b, and 132c enables the catalyst slurry preparation system 200 to have a value for the Coefficient of Variation (CoV) at one or more cross sections of the mixing vessel 110 that is indicative of a well-mixed catalyst slurry in the mixing vessel 110. As discussed above, the CoV describes the deviation of a local concentration of the catalyst slurry in the mixing vessel 110 from the mean concentration within one or more cross sections of the mixing vessel 110. The Coefficient of Variation (CoV) for the catalyst slurry concentration in the mixing vessel 110 of catalyst slurry preparation system 200, as used herein, is defined in Formula (2) as:

$$CoV = \left[ \frac{\sum_{i=1}^{n}(c_i - c_{avg})^2}{n-1} \right]^{0.5} \frac{1}{c_{mean}} \quad (2)$$

where $C_i$ is sample concentration of catalyst in the catalyst slurry taken at a first sampling location in the mixing vessel 110, $C_{avg}$ is the average concentration of catalyst in the catalyst slurry in all samples taken at all sampling locations in the mixing vessel 110, $C_{mean}$ is the mean concentration of catalyst in the catalyst slurry in all samples taken at the first sampling location in the mixing vessel 110, and n=number of locations where the catalyst slurry samples are taken. The presence of the hub 132 having at least three blades (e.g., blades 132a, 132b, and 132c) advantageously provides for a CoV value in the mixing vessel 110 of the catalyst slurry preparation system 200 that is less than about 0.4, 0.3, 0.2, 0.1, 0.05, or 0.01.

In aspects, the hub 232 comprising three blades 232a, 232b, and 232c enables the catalyst slurry preparation system 200 to have a value for the Coefficient of Variation (CoV) at one or more cross sections of the mixing vessel 210 that is indicative of a well-mixed catalyst slurry in the mixing vessel 210. The CoV describes the deviation of a local concentration of the catalyst slurry in the mixing vessel 210 from the mean concentration within one or more cross sections of the mixing vessel 210. The Coefficient of Variation (CoV) for the catalyst slurry concentration in the mixing vessel 210 of catalyst slurry preparation system 200, as used herein, is defined in Formula (3) as:

$$CoV = \left[ \frac{\sum_{i=1}^{n}(c_i - c_{avg})^2}{n-1} \right]^{0.5} \frac{1}{c_{mean}} \quad (3)$$

where $C_i$ is sample concentration of catalyst in the catalyst slurry taken at a first sampling location in the mixing vessel 210, $C_{avg}$ is the average concentration of catalyst in the catalyst slurry in all samples taken at all sampling locations in the mixing vessel 210, $C_{mean}$ is the mean concentration of catalyst in the catalyst slurry in all samples taken at the first sampling location in the mixing vessel 210, and n=number of locations where the catalyst slurry samples are taken. The presence of the hub 232 having at least three blades (e.g., blades 232a, 232b, and 232c) advantageously provides for a CoV value in the mixing vessel 210 of the catalyst slurry preparation system 200 that is less than about 0.4, 0.3, 0.2, 0.1, 0.05, or 0.01.

Because the consistency of catalyst concentration across the mixing vessel 210 can affect the consistency of catalyst concentration across the mixing vessel 110, having a hub 232 with at least three blades 232a, 232b, and 232c in mixing vessel 210 and a hub 132 with at least three blades 132a, 132b, and 132c in mixing vessel 110 in the catalyst slurry preparation system 200 can result in a low CoV (e.g., less than about 0.1) for the catalyst slurry concentration in the mixing vessel 110. For example, the CoV for the catalyst slurry concentration in the mixing vessel 210 can be in a range of about 0.1 to about 0.4. The catalyst slurry that flows from the mixing vessel 210 to mixing vessel 110 thus has a degree of consistency for the catalyst concentration that enables an even lower CoV for the catalyst slurry concentration in the mixing vessel 110 (e.g., in a range of less than about 0.1, 0.05, or 0.01).

In aspects of the system 200 of FIG. 2, the mixing vessel 210 and mixing vessel 110 can be constructed and configured such that there is a difference in elevation between the two mixing vessels 110 and 210. In some aspects, a vertical distance D between the inlet of the outlet conduit 213 and the location where the inlet conduit 111 introduces catalyst slurry to the mixing vessel 110 is greater than 0, 0.1, 0.2, 0.3, 0.4, 0.5, 0.6, 0.7, 0.8, 0.9, or 1.0 meters and less than 5, 4, 3, 2, or 1 meters. It is believed that having a vertical distance D can provide a head pressure that causes the catalyst slurry to flow from the mixing vessel 210 to the mixing vessel 110, reducing the amount of energy needed by pump 260 to pump the catalyst slurry, or eliminating the need for the pump 260. In embodiments where the pump 260 is not used, a valve can be used in place of the pump 260 so as to control the timing of flow of the catalyst slurry from the mixing vessel 210 to the mixing vessel 210.

Embodiments of the rotatable impeller system 130 of systems 100 and 200 and rotatable impeller system 230 of system 200 can include the hub 132 and 232 described for FIG. 1 and FIG. 2. Aspects of the disclosure contemplate that the rotatable impeller system 130 and/or rotatable impeller system 230 can include additional hubs. Using the mixing vessel 110 as exemplary of both mixing vessels 110 and 210 for purposes of a hub discussion, FIGS. 3A to 3H illustrate cross sectional views of the mixing vessel 110 with the rotatable impeller system 130 having hub 132 in combination with additional hubs connected to the agitator shaft 131 below the hub 132. Stated differently, the hub 132 is attached to or connected to the agitator shaft 131 above any of the additional hubs described below.

FIG. 3A shows the hub 132 (or top hub) having three blades 132a, 132b, and 132c, and additionally, hub 332 (or bottom hub) having two blades 332a and 332b. It is contemplated that hub 132 can have three or more blades and hub 332 can have two or more blades. In FIG. 3A, the hub 132 is attached to the agitator shaft 131 in the upper half 301 of the mixing vessel 110, and the hub 332 is attached to the agitator shaft 131 in the lower half 302 of the mixing vessel 110. In additional aspects, the hub 132 can be attached to the agitator shaft 131 at a distance from the top of the mixing vessel 110 that is from about 20% to about 50%, alternatively from about 30% to about 50%, alternatively from about 40% to about 50% of the height of the mixing vessel 110; and the hub 332 can be attached to the agitator shaft 131 below the hub 132 at a distance from the top of the mixing vessel 110 that is from about 50% to about 95%, alternatively from about 60% to about 95%, alternatively from about 70% to about 95%, alternatively from about 80% to about 90%, alternatively about 85% of the height of the mixing vessel 110. In aspects, the diameter D1 of the hub 132 and the diameter D1 of the hub 332 can each be from about 20% to about 60%, alternatively from about 30% to about 50%, alternatively about 40% of the diameter of the mixing vessel 110. In further aspects, the diameter of the hub 132 can be about equal to the diameter of the hub 332.

FIG. 3B also shows hub 132 (or top hub) and hub 332 (or bottom hub) from FIG. 3A, and both hubs 132 and 332 are attached to the agitator shaft 131 in the lower half 302 of the mixing vessel 110. In additional aspects, the hub 132 can be attached to the agitator shaft 131 at a distance from the top of the mixing vessel 110 that is from about 50% to about 75%, alternatively from about 50% to about 65%, alternatively from about 50% to about 60% of the height of the mixing vessel 110; and the hub 332 can be attached to the agitator shaft 131 below the hub 132 at a distance from the top of the mixing vessel 110 that is from about 50% to about 95%, alternatively from about 60% to about 95%, alternatively from about 70% to about 95%, alternatively from about 80% to about 90%, alternatively about 85% of the height of the mixing vessel 110.

FIG. 3C shows the hub 132 (or top hub) from FIG. 3A and another hub 333 (or bottom hub) having three blades 333a, 333b, and 333c. It is contemplated that hub 333 can have two or more blades, and hub 132 can have three or more blades. FIG. 3C illustrates that the diameter D1 of the hub 132 can be greater than diameter D2 of the hub 333. In aspects where the diameter D1 of the hub 132 is as described in FIG. 3A, the diameter D2 of hub 333 can be about 10% to about 50%, alternatively from about 20% to about 40%, alternatively about 30%, alternatively about 25%, alternatively, about 20%, alternatively, about 15%, alternatively, about 10% of the diameter of the mixing vessel 110. The hub 132 in FIG. 3C can be attached to the agitator shaft 131 in the upper half 301 or lower half 302 of the mixing vessel 110, and the hub 333 can be attached to the agitator shaft 131 in the lower half 302 of the mixing vessel 110. In additional aspects, the hub 132 can be attached to the agitator shaft 131 at a distance from the top of the mixing vessel 110 that is from about 20% to about 75%, alternatively, from about 30% to about 65%, alternatively from about 40% to about 60%, alternatively from about 45% to about 55% of the height of the mixing vessel 110; and the hub 333 can be attached to the agitator shaft 131 below the hub 132 at a distance from the top of the mixing vessel 110 that is from about 50% to about 95%, alternatively from about 60% to about 95%, alternatively from about 70% to about 95%, alternatively from about 80% to about 90%, alternatively about 85% of the height of the mixing vessel 110.

FIG. 3D shows an embodiment with three hubs 132, 332, and 334 (or top, middle, and bottom hubs). Hub 132 has three blades, hub 332 has two blades, and hub 334 has three blades; however, it is contemplated that hub 132 can have three or more blades, hub 332 can have two or more blades, and hub 334 can have two or more blades. The hub 132 from FIG. 3A is attached to the agitator shaft 131 in the upper half 301 of the mixing vessel 310, and two additional hubs 332 and 334 are attached to the agitator shaft 131 in the lower half 302 of the mixing vessel 110. In additional aspects, the hub 132 can be attached to the agitator shaft 131 at a distance from the top of the mixing vessel 110 that is from about 20% to about 50%, alternatively from about 30% to about 50%, alternatively from about 40% to about 50% of the height of the mixing vessel 110; the hub 332 can be attached to the agitator shaft 131 below the hub 132 at a distance from the top of the mixing vessel 110 that is from about 50% to about 95%, alternatively from about 60% to about 95%, alternatively from about 70% to about 95%, alternatively from about 80% to about 90%, alternatively about 85% of the height of the mixing vessel 110; and the hub 334 can be attached to the agitator shaft 131 below the hub 332 at a distance from the top of the mixing vessel 110 that is from about 50% to about 95%, alternatively from about 60% to about 95%, alternatively from about 70% to about 95%, alternatively from about 80% to about 90%, alternatively about 85% of the height of the mixing vessel 110. Hub 132 and hub 332 have features as described in FIG. 3A. Hub 334 can have three or more blades; alternatively, only two blades. In aspects, the diameter of the hub 132, the diameter of the hub 332, and the diameter of the hub 334 can each be from about 20% to about 60%, alternatively from about 30% to about 50%, alternatively about 40% of the diameter of the mixing vessel 110. In further aspects, the diameter of the hub 132, the diameter of the hub 332, and the diameter of the hub 334 can be about equal.

Figure 3H:
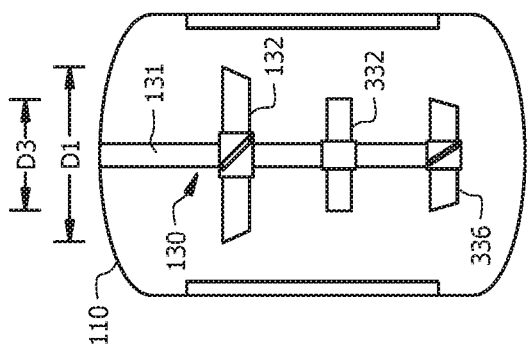
Figure 3G:
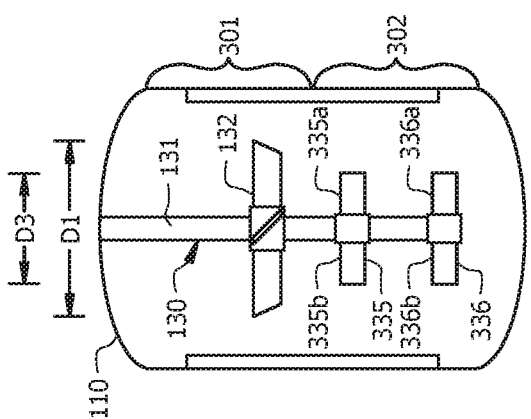
Figure 3F:
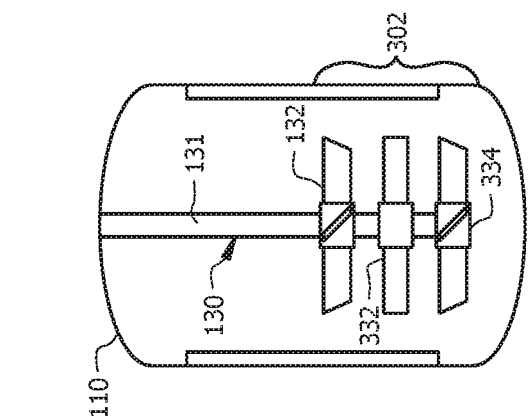
Figure 3E:
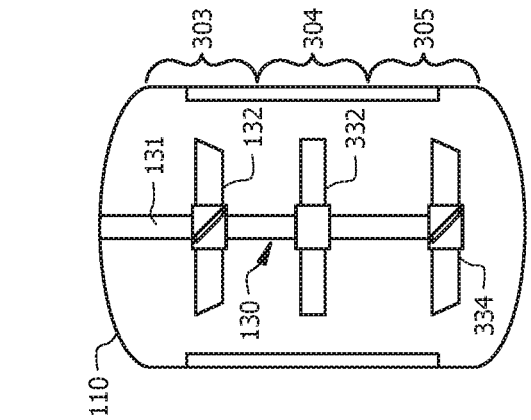

FIG. 3E shows the hubs 132, 332, and 334 (top, middle, and bottom hubs) of FIG. 3D, except the hub 132 is attached to the agitator shaft 131 in a top portion 303 of the mixing vessel 110, the hub 332 is attached to the agitator shaft 131 in a middle portion 304 of the mixing vessel 110, and the hub 334 is attached to the agitator shaft 131 in a bottom portion 305 of the mixing vessel 110. Hub 132 has three blades, hub 332 has two blades, and hub 334 has three blades; however, it is contemplated that hub 132 can have three or more blades, hub 332 can have two or more blades, and hub 334 can have two or more blades. In additional aspects, the hub 132 can be attached to the agitator shaft 131 at a distance from the top of the mixing vessel 110 that is from about 20% to about 45%, alternatively from about 30% to about 45%, alternatively from about 40% to about 45% of the height of the mixing vessel 110; the hub 332 can be attached to the agitator shaft 131 below the hub 132 at a distance from the top of the mixing vessel 110 that is from about 45% to about 75%, alternatively from about 45% to about 65%, alternatively from about 45% to about 55%, alternatively about 50% of the height of the mixing vessel 110; and the hub 334 can be attached to the agitator shaft 131 below the hub 332 at a distance from the top of the mixing vessel 110 that is from about 60% to about 95%, alternatively from about 70% to about 95%, alternatively from about 70% to about 90%, alternatively from about 75% to about 90%, alternatively about 85% of the height of the mixing vessel 110.

FIG. 3F shows hubs 132, 332, and 334 (top, middle, and bottom hubs) of FIG. 3D, with all three hubs 132, 332, and 334 attached to the agitator shaft 131 in the lower half 302 of the mixing vessel 110. Hub 132 has three blades, hub 332 has two blades, and hub 334 has three blades; however, it is contemplated that hub 132 can have three or more blades, hub 332 can have two or more blades, and hub 334 can have two or more blades. In additional aspects, the hub 132 can be attached to the agitator shaft 131 at a distance from the top of the mixing vessel 110 that is from about 50% to about 75%, alternatively from about 50% to about 65%, alternatively from about 50% to about 60% of the height of the mixing vessel 110; the hub 332 can be attached to the agitator shaft 131 below the hub 132 at a distance from the top of the mixing vessel 110 that is from about 60% to about 95%, alternatively from about 65% to about 95%, alternatively from about 70% to about 95%, alternatively from about 80% to about 90%, alternatively about 85% of the height of the mixing vessel 110; and the hub 334 can be attached to the agitator shaft 131 below the hub 332 at a distance from the top of the mixing vessel 110 that is from about 50% to about 95%, alternatively from about 60% to about 95%, alternatively from about 70% to about 95%, alternatively from about 80% to about 90%, alternatively about 85% of the height of the mixing vessel 110.

FIG. 3G shows hubs 132, 335, and 336 (top, middle, and bottom hubs). Hub 132 is as described in FIG. 3A, hub 335 is shown with two blades 335a and 335b, and hub 336 is also shown with two blades 336a and 336b. It is contemplated that hub 132 can have three or more blades, hub 335 can have two or more blades, and hub 336 can have two or more blades. Alternative aspects contemplated that hub 335 and/or hub 336 can have three or more blades. FIG. 3G illustrates that the diameter D1 of the hub 132 can be greater than diameter D4 of the hub 335 and the diameter D4 of hub 336. In aspects where the diameter D1 of the hub 132 is as described in FIG. 3A, the diameter D3 of hub 335 and hub 336 can be about 10% to about 50%, alternatively from about 20% to about 40%, alternatively about 30%, alternatively about 25%, alternatively, about 20%, alternatively, about 15%, alternatively, about 10% of the diameter of the mixing vessel 110. The hub 132 in FIG. 3G can be attached to the agitator shaft 131 in the upper half 301 or lower half 302 of the mixing vessel 110, and the hub 335 as well as hub 336 can be attached to the agitator shaft 131 in the lower half 302 of the mixing vessel 110.

In additional aspects for FIG. 3G, the hub 132 can be attached to the agitator shaft 131 at a distance from the top of the mixing vessel 110 that is from about 20% to about 50%, alternatively from about 30% to about 50%, alternatively from about 40% to about 50% of the height of the mixing vessel 110; the hub 335 can be attached to the agitator shaft 131 below the hub 132 at a distance from the top of the mixing vessel 110 that is from about 50% to about 95%, alternatively from about 60% to about 95%, alternatively from about 70% to about 95%, alternatively from about 80% to about 90%, alternatively about 85% of the height of the mixing vessel 110; and the hub 336 can be attached to the agitator shaft 131 below the hub 335 at a distance from the top of the mixing vessel 110 that is from about 50% to about 95%, alternatively from about 60% to about 95%, alternatively from about 70% to about 95%, alternatively from about 80% to about 90%, alternatively about 85% of the height of the mixing vessel 110.

FIG. 3H shows hubs 132, 332, and 336. Hubs 132 and 332 are as described in FIG. 3A. Hub 336 is as described in FIG. 3G. Hub 132 has three blades, hub 332 has two blades, and hub 336 has three blades; however, it is contemplated that hub 132 can have three or more blades, hub 332 can have two or more blades, and hub 336 can have two or more blades. Hubs 132 and 332 both can have a diameter D1 as described herein, and hub 336 can have a diameter D3 as described herein. The distance of each of hubs 132, 332, and 336 from the top of the mixing vessel 110 can be any corresponding distance described for hubs 132, 332, and 336 above.

FIGS. 4A to 4D illustrate side views of hubs 401, 403, 405, and 407 having concave top or bottom sides. Hub 132 in FIGS. 1, 2, and 3A to 3H can be embodied as one of hubs 401 and 403 shown in FIGS. 4A and 4B. Any of hubs 332, 333, 334, 335, and 336 in FIGS. 3A to 3H can be embodied as one of hubs 401, 403, 405, and 407 of FIGS. 4A to 4D.

Figure 4A:
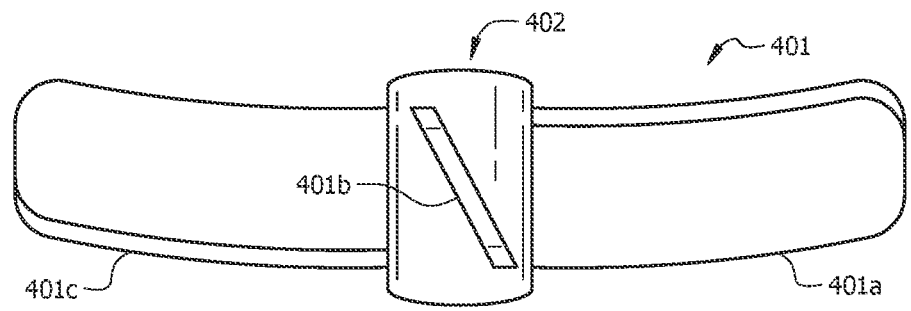
FIGS. 4A to 4D illustrate side views of hubs having a concave top side or a concave bottom side.

FIG. 4A shows a hub 401 having three blades 401a, 401b, and 401c. The contour of the blades 401a, 401b, and 401c is such that the top side 402 of the hub 401 is concave. When connected to the agitator shaft 131/231, the top side 402 of the hub 401 faces the top of the mixing vessel 110/210. In alternative embodiments, hub 401 can have more than three blades. In aspects, the hub 401 can be used as hub 132, hub 232, any of hubs 332/333/334/335/336, or a combination thereof.

Figure 4B:
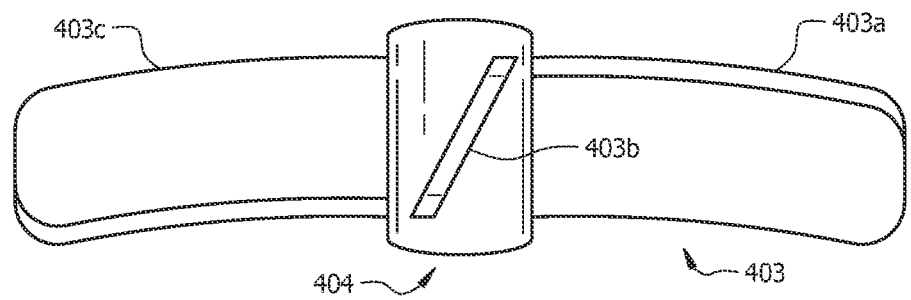

FIG. 4B shows a hub 403 having three blades 403a, 403b, and 403c. The contour of the blades 403a, 403b, and 403c is such that the bottom side 404 of the hub 403 is concave. When connected to the agitator shaft 131/231, the bottom side 404 of the hub 403 faces the bottom of the mixing vessel 110/210. In alternative embodiments, hub 403 can have more than three blades. In aspects, the hub 403 can be used as hub 132, hub 232, any of hubs 332/333/334/335/336, or a combination thereof.

Figure 4C:
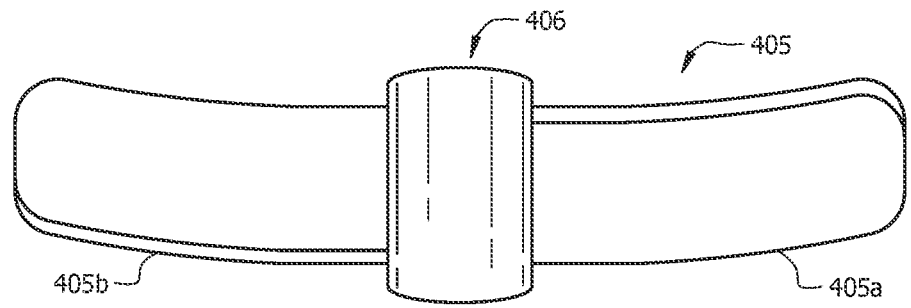

FIG. 4C shows a hub 405 having two blades 405a and 405b. The contour of the blades 405a and 405b is such that the top side 406 of the hub 405 is concave. When connected to the agitator shaft 131/231, the top side 406 of the hub 405 faces the top of the mixing vessel 110/210. In aspects, the hub 405 can be used as any of hubs 332/333/334/335/336.

Figure 4D:
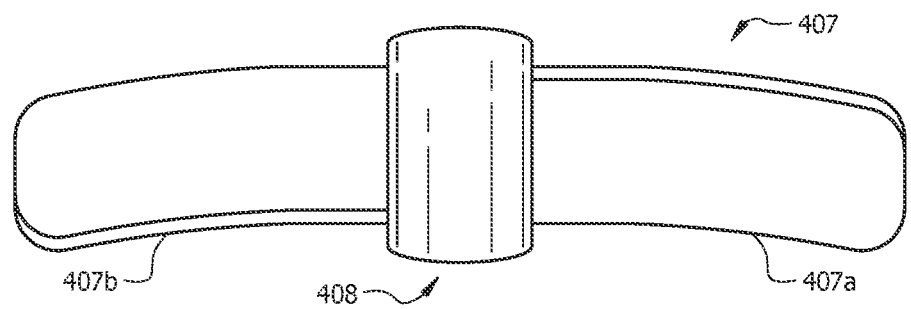

FIG. 4D shows a hub 407 having two blades 407a and 407b. The contour of the blades 407a and 407b is such that the bottom side 408 of the hub 407 is concave. When connected to the agitator shaft 131/231, the bottom side 408 of the hub 407 faces the bottom of the mixing vessel 110/210. In aspects, the hub 407 can be used as any of hubs 332/333/334/335/336.

FIGS. 5A to 5D illustrate plan views of hubs 501, 502, 503, and 504 having two, three, four, and five blades, respectively. Generally, the blades of each of hubs 501, 502, 503, and 504 are equally spaced along a circumference of rotation of the blades. When referring to a diameter of a hub described herein, the diameter is measured with respect to the circle formed by the circumference of rotation of the blades of the hub.

Figure 5A:
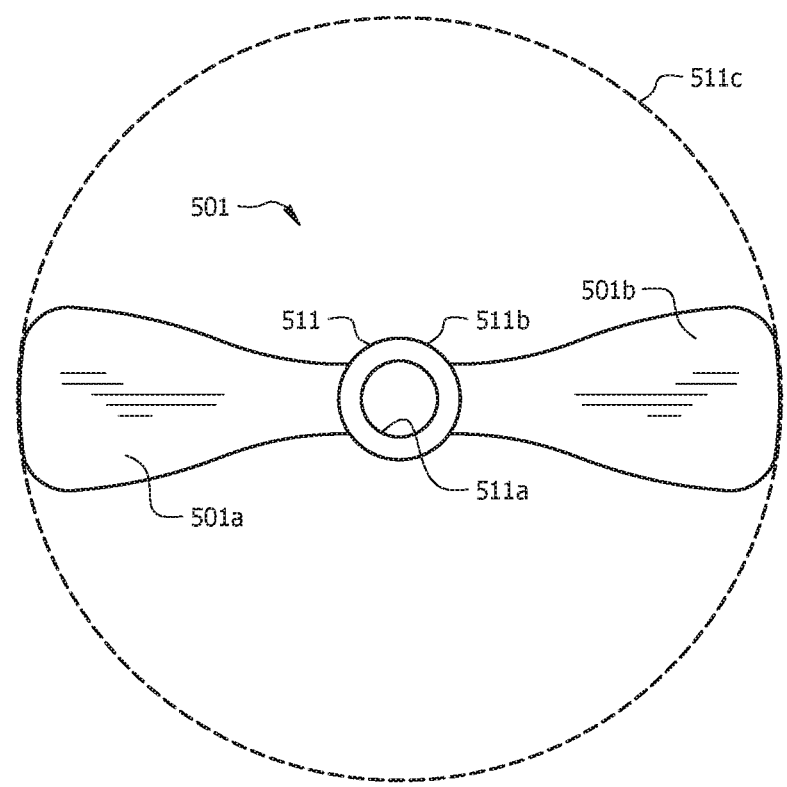
FIGS. 5A to 5D illustrate plan views of hubs having two, three, four, and five blades.

In FIG. 5A, the hub 501 has two blades 501a and 501b. Each blade 501a and 501b is connected to an outer surface 511b of a central portion 511 of the hub 501. An inside surface 511a of the central portion 511 abuts and attaches or connects to the agitator shaft 131/231 of mixing vessel 110/210. The blades 501a and 501b can be seen as equally spaced along a circumference of rotation 511c formed by the blades 501a and 501b when they rotate.

Figure 5B:
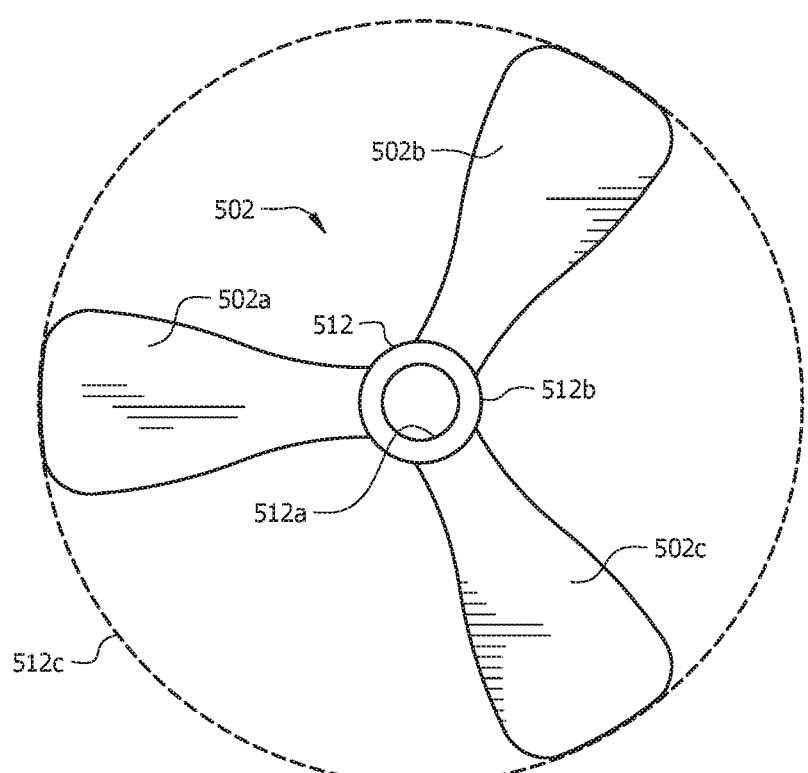

In FIG. 5B, the hub 502 has three blades 502a, 502b, and 502c. Each blade 502a, 502b, and 502c is connected to an outer surface 512b of a central portion 512 of the hub 502. An inside surface 512a of the central portion 512 abuts and attaches or connects to the agitator shaft 131/231 of mixing vessel 110/210. The blades 502a, 502b, and 502c can be seen as equally spaced along a circumference of rotation 512c formed by the blades 502a, 502b, and 502c when they rotate.

Figure 5C:
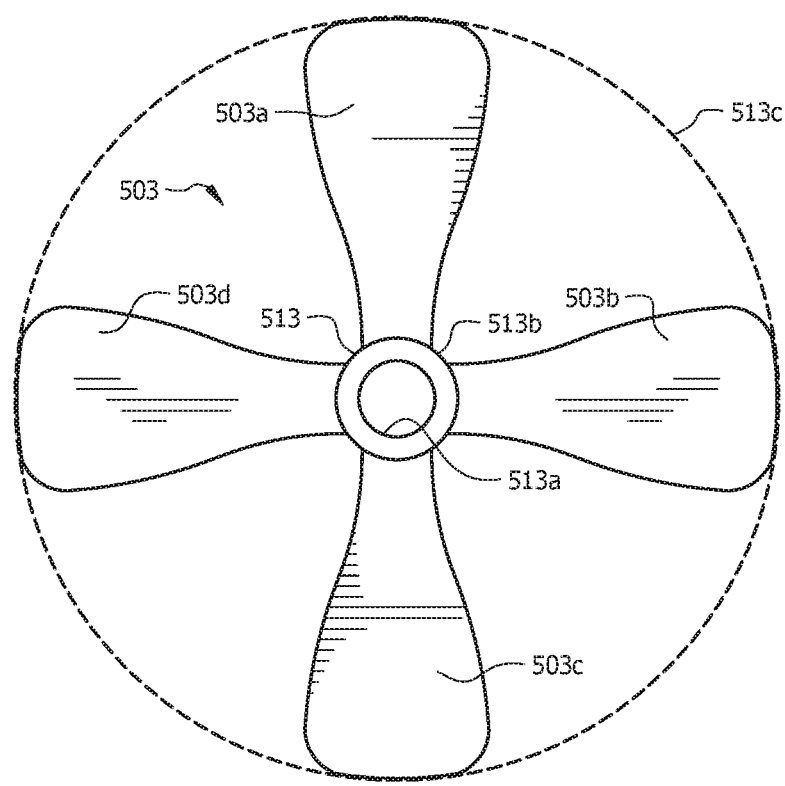

In FIG. 5C, the hub 503 has four blades 503a, 503b, 503c, and 503d. Each blade 503a, 503b, 503c, and 503d is connected to an outer surface 513b of a central portion 513 of the hub 503. An inside surface 513a of the central portion 513 abuts and attaches or connects to the agitator shaft 131/231 of mixing vessel 110/210. The blades 503a, 503b, 503c, and 503d can be seen as equally spaced along a circumference of rotation 513c formed by the blades 503a, 503b, 503d, and 503d when they rotate.

Figure 5D:
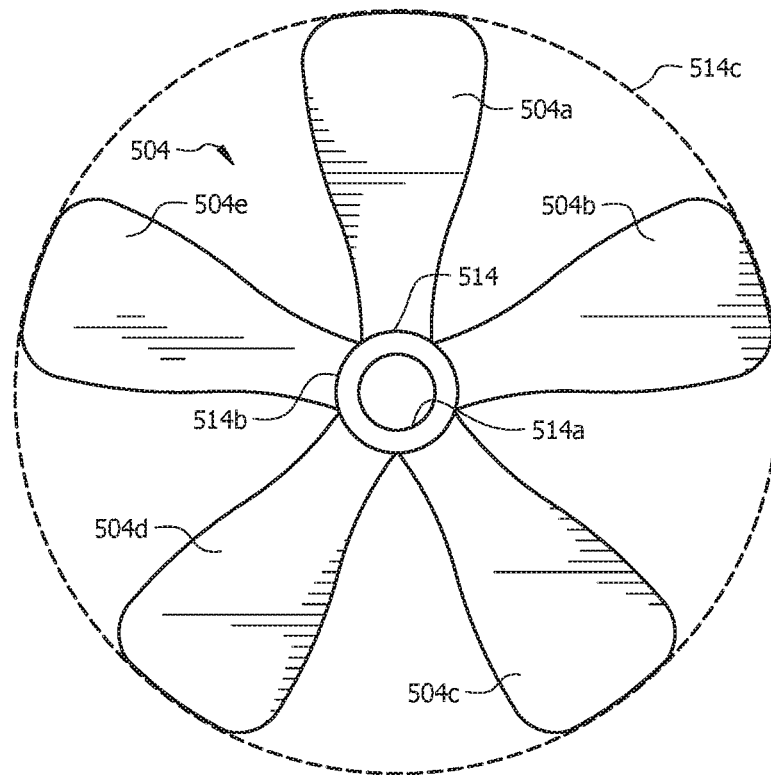

In FIG. 5D, the hub 504 has five four blades 504a, 504b, 504c, 504d, and 504e. Each blade 504a, 504b, 504c, 504d, and 504e is connected to an outer surface 514b of a central portion 514 of the hub 504. An inside surface 514a of the central portion 514 abuts and attaches or connects to the agitator shaft 131/231 of mixing vessel 110/210. The blades 504a, 504b, 504c, 504d, and 505e can be seen as equally spaced along a circumference of rotation 514c formed by the blades 504a, 504b, 504d, 504e, and 504d when they rotate.

In aspects, the shape of the central portions 511, 512, 513, and 514 of the hubs 501, 502, 503, and 504 can be any shape such that the inner surfaces 511a, 512a, 513a, and 514a can connect or attach to an agitator shaft (e.g., agitator shaft 131 or 231) and such that the outer surfaces 511b, 512b, 513b, and 514b can attach or connect to the blades. In FIGS. 5A to 5D, the central portions 511, 512, 513, and 514 of the hubs 501, 502, 503, and 504 are illustrated having a cylindrical shape.

FIGS. 6A to 6D are provided to describe aspects of the disclosure where the pitch angle of a blade attached to a hub can be used to affect the axial and/or radial flow of the catalyst slurry at different locations in mixing vessels 110 and 210. Generally, the blades of a hub can be all attached to the hub at the same pitch angle, and it is contemplated that different pitched hubs can be used in combination to vary the direction of flow of the catalyst slurry along the height of the mixing vessel 110/210, so as minimize differences in the catalyst concentration in the catalyst slurry across the mixing vessel 110/210. The pitch angles discussed in FIGS. 6A to 6D are relative to the direction of rotation shown by arrow R.

Figure 6A:
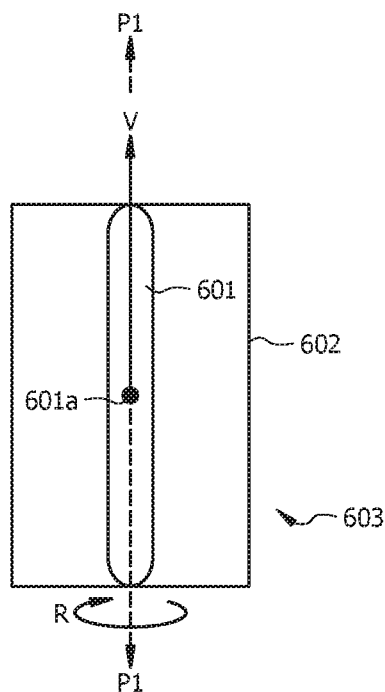
FIGS. 6A to 6D illustrate side views of a blade connected to a central portion of a hub.

FIG. 6A illustrates a side view of a blade 601 connected to a central portion 602 of a hub 603, with no pitch, or a pitch angle of 0°. The dimensions of the blade 601 and central portion 602 of the hub 603 are not to scale, nor should they be limited in relative size by the view shown in FIG. 6A. The angle between the center plant P1 that extends through the center point 601a of blade 601 and the vertical plane V is 0°. In FIG. 6A, the blade 601 is a flat piece of material, and the center plane P1 extends through the center point 601a and, through the entire blade 601. In other configurations of blades, such as those shown for blades 604 and 608 in FIGS. 6C and 6D, the center plant P1 may extend through portions of the blade and not the entire blade. A pitch angle of 0° promotes radial flow (relative to the radius of the mixing vessel 110/210) of the catalyst slurry towards the sides of the mixing vessel 110/210.

Figure 6B:
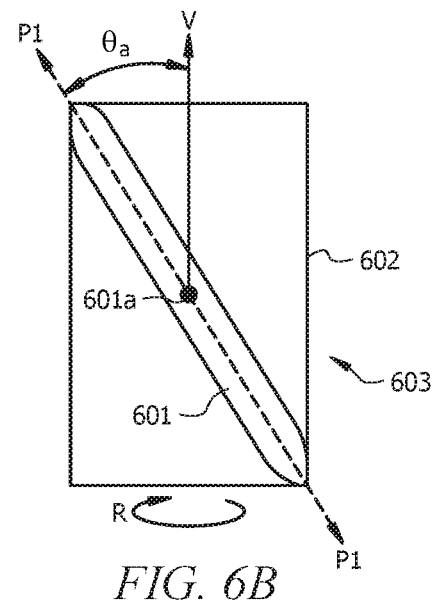

FIG. 6B illustrates a side view of a blade 601 connected to a central portion 602 of a hub 600 at a pitch angle greater than 0°. The dimensions of the blade 601 and central portion 602 of the hub 603 are not to scale, nor should they be limited in relative size by the view shown in FIG. 6B. The blade 601 is illustrated as a flat piece of material in FIG. 6B. The pitch angle of the blade 601 can be measured from a center point 601a of the blade 601. The center plane P1 by which the pitch angle $\theta_A$ is measured extends through the center point 601a and, in the case of blade 601 which is a flat piece of material, through the entire blade 601. The pitch angle $\theta_A$ of the blade 601 can be in a range of from about 5° and 45°; alternatively, from about 10° and 35°; alternatively, from about 15° and 25°. The pitch angle $\theta_A$ promotes a combination of axial and radial flow of the catalyst downward and sideward in the mixing vessel 110/210.

Figure 6C:
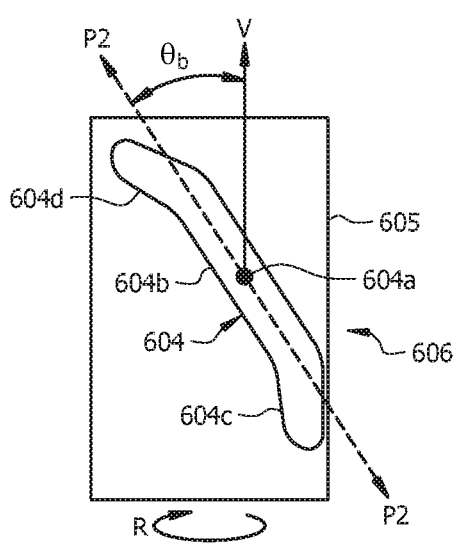

FIG. 6C illustrates a side view of a blade 604 connected to a central portion 605 of a hub 606. The dimensions of the blade 604 and central portion 605 of the hub 606 are not to scale, nor should they be limited in relative size by the view shown in FIG. 6C. The blade 604 illustrates that the blades disclosed herein can have an odd number of portions (3, 5, 7, 9, or more portions) connected at angles with respect to adjacent portion(s). The blade 604 in FIG. 6C has three portions 604b, 604c, and 604d. The pitch angle of the blade 604 can be measured from a center point 604a of the blade 604. The center plane P2 by which the pitch angle $\theta_C$ is measured extends through the center point 604a and, in the case of blade 604, through the center portion 604b of the blade 604 such that the angle between the end portions 604c/604d and the center plane P2 is equal (the center plane P2 is perpendicular to a plane of symmetry for the blade 604). In aspects, the center plane P2 can be perpendicular to the plane of symmetry for any multi-portioned blade having an odd number of portions (e.g., a blade having 3, 5, 7, 9, or more portions). The pitch angle $\theta_B$ of the blade 604 can be in a range of from about 5° and 45°; alternatively, from about 10° and 35°; alternatively, from about 15° and 25°. The pitch angle $\theta_B$ in combination with the configuration of blade 604 promotes primarily axial flow of the catalyst downward in the mixing vessel 110/210.

Figure 6D:
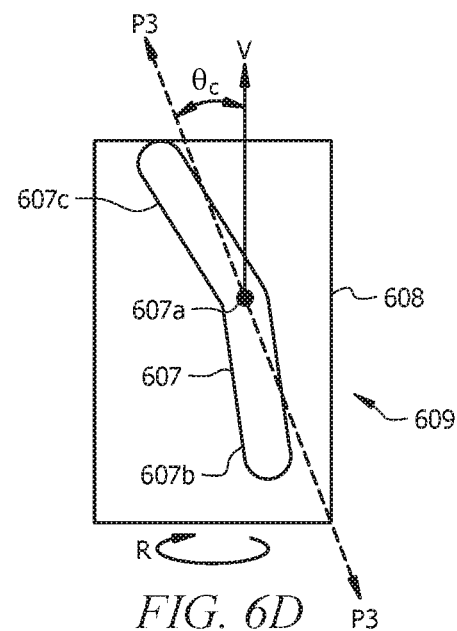

FIG. 6D illustrates a side view of a blade 607 connected to a central portion 608 of a hub 609. The dimensions of the blade 607 and central portion 608 of the hub 609 are not to scale, nor should they be limited in relative size by the view shown in FIG. 6D. The blade 607 illustrates that the blades disclosed herein can have an even number of portions (2, 4, 6, or more portions) connected at angles with respect to adjacent portion(s). The blade 607 in FIG. 6D has two portions 607b and 607c. The pitch angle of the blade 607 can be measured from a center point 607a of the blade 607. The center plane P3 by which the pitch angle $\theta_C$ is measured extends through the center point 607a and, in the case of blade 607, partially through both portions 607b and 607c that are connected to the center point 607a of the blade 607 such that the angle between the portions 604b/604c and the center plane P3 is equal (the center plane P3 is perpendicular to a plane of symmetry for the blade 607). In aspects, the center plane P3 can be perpendicular to the plane of symmetry for any multi-portioned blade having an even number of portions (e.g., a blade having 2, 4, 6, 8, or more portions). The pitch angle $\theta_C$ of the blade 607 can be in a range of from about 5° and 45°; alternatively, from about 10° and 35°; alternatively, from about 15° and 25°. The pitch angle $\theta_C$ in combination with the configuration of blade 607 promotes primarily axial flow of the catalyst downward in the mixing vessel 110/210.

In aspects, it is contemplated that the hub 132 of mixing vessel 110 in FIGS. 1, 2, and 3A-3H can have blades 132a, 132b, and 132c of a configuration shown in FIG. 6B, 6C, or 6D; and hub 132 can be used in combination with any of hubs 332, 333, 334, 335, and 336 each independently having a configuration selected from FIGS. 6A to 6D. Similarly, in aspects, it is contemplated that the hub 232 of mixing vessel 210 in FIG. 2 (FIGS. 3A to 3H also being applicable for hub 232 in place of hub 132) can have blades 232a, 232b, and 232c of a configuration shown in FIG. 6B, 6C, or 6D; and hub 232 can be used in combination with any of hubs 332, 333, 334, 335, and 336 each independently having a configuration selected from FIGS. 6A to 6D.

Also disclosed herein is a process for mixing a catalyst slurry in an embodiment of a catalyst slurry preparation system 100 or 200 disclosed herein. Aspects of the process can include preparing the catalyst slurry comprising a solid particulate catalyst and a liquid hydrocarbon diluent in any embodiment of the catalyst slurry preparation system 100 or 200 disclosed herein.

In some aspects, the catalyst slurry is prepared in mixing vessel 110. In such aspects, preparing the catalyst slurry can include feeding solid catalyst particles and carrier liquid via conduits 111 and 112 to the mixing vessel 110, and mixing the particles and liquid with a rotatable impeller system 130 to form a catalyst slurry in the mixing vessel 110.

In some aspects, the catalyst slurry is prepared in mixing vessel 210 and only mixed and/or maintained in the mixing vessel 110. In such aspects, preparing the catalyst slurry can include feeding solid catalyst particles and carrier liquid via conduits 211 and 212 to the mixing vessel 210, and mixing the particles and liquid with the rotatable impeller system 230 to form a catalyst slurry in the mixing vessel 210. For a process that prepares the catalyst slurry in mixing vessel 210, the process can further include flowing at periodic intervals of time (e.g., in a range of from about 12 to about 72 hours) catalyst slurry from the second mixing vessel 210 into the first mixing vessel 110 according to the techniques described herein (e.g., via valve and conduits 111 and 213 in FIG. 2), and mixing the catalyst slurry in the mixing vessel 110. In such processes, the concentration of catalyst in the catalyst slurry of both mixing vessels 110 and 210 is about equal, as is described herein.

In some aspects, a first catalyst slurry is prepared in mixing vessel 110 and a second catalyst slurry is prepared in the second mixing vessel 210, the first catalyst slurry being distinguishable from the second catalyst slurry, in that, the concentration of catalyst in the first catalyst slurry is lower than the concentration of catalyst in the second catalyst slurry. In such aspects, preparing the catalyst slurry can include feeding solid catalyst particles and carrier liquid via conduits 211 and 212 to the mixing vessel 210 to form the second catalyst slurry, mixing the particles and liquid with the rotatable impeller system 230 to form the second catalyst slurry in the mixing vessel, 210, flowing at periodic intervals of time (e.g., in a range of from about 12 to about 72 hours) the second catalyst slurry from the second mixing vessel 210 into the first mixing vessel 110 according to the techniques described herein (e.g., via valve and conduits 111 and 213 in FIG. 2), feeding carrier liquid via conduit 116 into the mixing vessel 110, and mixing the received second catalyst slurry with the added carrier liquid in the mixing vessel 110 with the rotatable impeller system 130 to form the first catalyst slurry.

Aspects of the processes can further include feeding the catalyst slurry (e.g., embodied as the catalyst slurry or the first catalyst slurry) from the mixing vessel 110 of the catalyst slurry preparation system 100 or 200 to a polymerization reactor 150, and contacting one or more olefin monomers (e.g., ethylene or propylene, with an optional comonomer such as butene, hexene, or octene) with the catalyst slurry under polymerization conditions in the polymerization reactor 150 to produce a polyolefin (e.g., polyethylene or polypropylene). Such processes can further include discharging the polyolefin (e.g., in a polymerization product) from the polymerization reactor 150 via a product discharge conduit 152.

ADDITIONAL DISCLOSURE

The following is provided as additional disclosure for combinations of features and aspects of the present invention.

Aspect 1 is a catalyst slurry preparation system comprising a first mixing vessel, a first rotatable impeller system connected to the first mixing vessel, and a first motor connected to the first rotatable impeller system.

Aspect 2 is the system of Aspect 1, wherein the rotatable impeller system comprises a first agitator shaft and a first hub connected to the first agitator shaft, wherein the first hub and at least a portion of the first agitator shaft are positioned within the first mixing vessel along a longitudinal axis of the first mixing vessel, and wherein the first hub comprises at least three blades.

Aspect 3 is the system of any of Aspects 1 to 2, further comprising a second mixing vessel, a second rotatable impeller system connected to the second mixing vessel, and a second motor connected to the second rotatable impeller system.

Aspect 4 is the system of Aspect 3, wherein the second rotatable impeller system comprises a second agitator shaft and a second hub connected to the second agitator shaft, wherein the second hub and at least a portion of the second agitator shaft are positioned within the second mixing vessel along a longitudinal axis of the second mixing vessel, wherein the second hub comprises at least three blades, wherein an outlet of the second mixing vessel is connected to an inlet of the first mixing vessel.

Aspect 5 is the system of any of Aspects 1 to 4, further comprising a first catalyst slurry in the first mixing vessel and a second catalyst slurry in the second mixing vessel, wherein a first concentration of a solid particulate catalyst in the first catalyst slurry is about equal to a second concentration of the solid particulate catalyst in the second catalyst slurry.

Aspect 6 is the system of Aspect 5, wherein the second concentration of the solid particulate catalyst in the second catalyst slurry is equal to or less than about 20, 15, 12, or 10 wt % based on a total weight of the second catalyst slurry, and wherein the first concentration of the solid particulate catalyst in the first catalyst slurry is equal to or less than about 20, 15, 12, or 10 wt % based on a total weight of the first catalyst slurry.

Aspect 7 is the system of Aspect 5, wherein the second concentration of the solid particulate catalyst in the second catalyst slurry is greater than about 10, 12, 15, or 20 wt % based on a total weight of the second catalyst slurry, and wherein the first concentration of the solid particulate catalyst in the first catalyst slurry is equal to or less than about 20, 15, 12, or 10 wt % based on a total weight of the first catalyst slurry.

Aspect 8 is the system of any of Aspects 5 to 7, wherein the solid particulate catalyst comprises a chromium-containing catalyst, a Ziegler-Natta catalyst, or a metallocene catalyst.

Aspect 9 is the system of any of Aspects 1 to 8, wherein the first mixing vessel is configured to hold a first volume of the first catalyst slurry suitable to feed the first catalyst slurry to a polymerization reactor for 12 to 72 hours.

Aspect 10 is the system of any of Aspects 3 to 9, wherein the second mixing vessel is configured to hold a second volume of the second catalyst slurry that is four to eight times the first volume of the first catalyst slurry.

Aspect 11 is the system of any of Aspects 1 to 10, wherein the three blades of the first hub are configured such that a top side or a bottom side of the first hub is concave.

Aspect 12 is the system of any of Aspects 1 to 11, wherein the first rotatable impeller system further comprises one or more additional hubs connected to the first agitator shaft, wherein the one or more additional hubs each have at least two blades.

Aspect 13 is the system of Aspect 12, wherein the first hub is connected to the first agitator shaft in an upper half of the first mixing vessel and the one or more additional hubs is connected to the first agitator shaft in a lower half of the first mixing vessel.

Aspect 14 is the system of Aspect 12, wherein the first hub and the one or more additional hubs are connected to the first agitator shaft in a lower half of the first mixing vessel.

Aspect 15 is the system of any of Aspects 12 to 14, wherein the at least two blades of the one or more additional hub are configured such that a top side or a bottom side of the additional hub(s) is concave.

Aspect 16 is the system of any of Aspects 12 to 15, wherein the first hub is above the one or more additional hubs, and wherein a diameter of the first hub is greater than a diameter of the additional hub(s).

Aspect 17 is the system of any of Aspects 12 to 15, wherein the one or more additional hubs comprise a second hub and a third hub, connected to the first agitator shaft, wherein the third hub comprises at least two blades.

Aspect 18, is the system of Aspect 17, wherein the first hub is connected to the first agitator shaft in an upper half of the first mixing vessel, the second hub is connected to the first agitator shaft in a lower half of the first mixing vessel, and the third hub is connected to the first agitator shaft in the lower half of the first mixing vessel.

Aspect 19 is the system of Aspect 17, wherein the first hub is connected to the first agitator shaft in an upper portion of the first mixing vessel, the second hub is connected to the first agitator shaft in a middle portion of the first mixing vessel, and the third hub is connected to the first agitator shaft in a lower portion of the first mixing vessel.

Aspect 20 is the system of Aspect 17, wherein the first hub, the second hub, and the third hub are connected to the first agitator shaft in a lower half of the first mixing vessel.

Aspect 21 is the system of any of Aspects 17 to 20, wherein the first hub is above the second hub and the third hub, and wherein a diameter of the first hub is greater than i) a diameter of the second hub, ii) a diameter of the third hub, or iii) a diameter of the second hub and a diameter of the third hub.

Aspect 22 is the system of any of Aspects 17 to 21, wherein the three blades of the first hub are configured such that a top side or a bottom side of the first hub is concave, wherein the at least two blades of the second hub are configured such that a top side or a bottom side of the second hub is concave, and wherein the at least two blades of the third hub are configured such that a top side or a bottom side of the third hub is concave.

Aspect 23 is the system of any of Aspects 1 to 22, wherein the first motor i) has 2, 4, 8, 12, or 16 poles, ii) is configured to operate at 50 Hz or 60 Hz, iii) is configured to operate under no load conditions of 900, 1200, 1500, 1800, 3000, or 3600 rpm, or iv) a combination thereof.

Aspect 24 is the system of any of Aspects 3 to 23, wherein the second motor i) has 2, 4, 8, 12, or 16 poles, ii) is configured to operate at 50 Hz or 60 Hz, iii) is configured to operate under no load conditions of 900, 1200, 1500, 1800, 3000, or 3600 rpm, or iv) a combination thereof.

Aspect 25 is a process comprising preparing a first catalyst slurry comprising a solid particulate catalyst and a carrier liquid in the catalyst slurry preparation system of any of Aspects 1 to 24.

Aspect 26 is the process of Aspect 25, wherein the first catalyst slurry is prepared in the first mixing vessel of the catalyst slurry preparation system, and the process further comprises introducing the solid particulate catalyst and the carrier liquid into the first mixing vessel, and mixing the solid particulate catalyst and the carrier liquid to form the first catalyst slurry in the first mixing vessel.

Aspect 27 is the process of Aspect 25, wherein the catalyst slurry preparation system has a first mixing vessel and a second mixing vessel, wherein the first catalyst slurry is prepared in the second mixing vessel, wherein the process further comprises flowing the first catalyst slurry from the second mixing vessel to the first mixing vessel and mixing the first catalyst slurry in the first mixing vessel.

Aspect 28 is the process of Aspect 25, wherein the catalyst slurry is a first catalyst slurry, the process further comprising preparing a second catalyst slurry comprising the solid particulate catalyst and the carrier liquid in the catalyst slurry preparation system, wherein the first catalyst slurry is prepared in a first mixing vessel of the catalyst slurry preparation system and the second catalyst slurry is prepared in a second mixing vessel of the catalyst slurry preparation system.

Aspect 29 is the process of Aspect 28, further comprising flowing the second catalyst slurry from the second mixing vessel to the first mixing vessel, adding carrier fluid to the first mixing vessel, and mixing the second catalyst slurry and the added carrier fluid to form the first catalyst slurry.

Aspect 30 is the process of any of Aspects 28 to 29, wherein a first concentration of the solid particulate catalyst in the first catalyst slurry is lower than a second concentration of the solid particulate catalyst in the second catalyst slurry.

Aspect 31 is the process of Aspect 30, wherein the second concentration of the solid particulate catalyst in the second catalyst slurry is equal to or less than about 20, 15, 12, or 10 wt % based on a total weight of the second catalyst slurry, and wherein the first concentration of the solid particulate catalyst in the first catalyst slurry is equal to or less than about 20, 15, 12, or 10 wt % based on a total weight of the first catalyst slurry.

Aspect 32 is the process of Aspect 30, wherein the second concentration of the solid particulate catalyst in the second catalyst slurry is greater than about 10, 12, 15, or 20 wt % based on a total weight of the second catalyst slurry, and wherein the first concentration of the solid particulate catalyst in the first catalyst slurry is equal to or less than about 20, 15, 12, or 10 wt % based on a total weight of the first catalyst slurry.

Aspect 33 is the process of any of Aspects 30 to 32, wherein the solid particulate catalyst comprises a chromium-containing catalyst, a Ziegler-Natta catalyst, or a metallocene catalyst.

Aspect 34 is the process of any of Aspects 25 to 33, further comprising feeding the first catalyst slurry from the first mixing vessel of the catalyst slurry preparation system to a polymerization reactor; and contacting one or more olefins with the first catalyst slurry under polymerization conditions in the polymerization reactor.

While embodiments of the disclosure have been shown and described, modifications thereof can be made without departing from the spirit and teachings of the invention. The embodiments and examples described herein are exemplary only, and are not intended to be limiting. Many variations and modifications of the invention disclosed herein are possible and are within the scope of the invention.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, 5, 6, . . . ; greater than 0.10 includes 0.11, 0.12, 0.13, 0.14, 0.15, . . . ). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, ... 50 percent, 51 percent, 52 percent ... 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of.

Accordingly, the scope of protection is not limited by the description set out above but is only limited by the claims which follow, that scope including all equivalents of the subject matter of the claims. Each and every claim is incorporated into the specification as an aspect of the present invention. Thus, the claims are a further description and are an addition to the detailed description of the present invention.

What is claimed is:

1. A process comprising:
    preparing a first catalyst slurry comprising a solid particulate catalyst and a carrier liquid in a catalyst slurry preparation system,
    wherein the catalyst slurry preparation system comprises:
        a mixing vessel,
        a rotatable impeller system connected to the mixing vessel, and
        a motor connected to the rotatable impeller system,
    wherein the rotatable impeller system comprises an agitator shaft and a first hub connected to the agitator shaft, wherein the first hub and at least a portion of the agitator shaft are positioned within the mixing vessel along a longitudinal axis of the mixing vessel, and wherein the first hub comprises three blades, and
    wherein the mixing vessel is a first mixing vessel, the process further comprising:
    preparing a second catalyst slurry comprising the solid particulate catalyst and the carrier liquid in the catalyst slurry preparation system,
    wherein the catalyst slurry preparation system further comprises:
        a second mixing vessel,
        a second rotatable impeller system connected to the second mixing vessel, and
        a second motor connected to the second rotatable impeller system,
    wherein the second rotatable impeller system comprises a second agitator shaft and a second hub connected to the second agitator shaft,
    wherein the second hub and at least a portion of the second agitator shaft are positioned within the second mixing vessel along a longitudinal axis of the second mixing vessel,
    wherein the second hub comprises three blades,
    wherein an outlet of the second mixing vessel is connected to an inlet of the first mixing vessel,
    wherein the first mixing vessel is configured to hold a first volume of the first catalyst slurry suitable to feed the first catalyst slurry to a polymerization reactor for 12 to 72 hours, and
    wherein the second mixing vessel is configured to hold a second volume of the second catalyst slurry that is four to eight times the first volume of the first catalyst slurry.

2. The process of claim 1, further comprising:
    feeding the first catalyst slurry from the mixing vessel of the catalyst slurry preparation system to a polymerization reactor; and
    contacting one or more olefins with the first catalyst slurry under polymerization conditions in the polymerization reactor.

3. The process of claim 1, wherein a first concentration of the solid particulate catalyst in the first catalyst slurry is about equal to a second concentration of the solid particulate catalyst in the second catalyst slurry.

4. The process of claim 3, wherein the second concentration of the solid particulate catalyst in the second catalyst slurry is equal to or less than about 10 wt % based on a total weight of the second catalyst slurry.

5. The process of claim 1, wherein the three blades of the first hub, the second hub, or both are configured such that a top side or a bottom side of the first hub is concave.

6. The process of claim 1, wherein the solid particulate catalyst comprises a chromium-containing catalyst, a Ziegler-Natta catalyst, or a metallocene catalyst.

7. The process of claim 1, wherein the first rotatable impeller system further comprises a first additional hub connected to the agitator shaft, wherein the first additional hub comprises at least two blades, or
    wherein the second rotatable impeller system further comprises a second additional hub connected to the agitator shaft, wherein the second additional hub comprises at least two blades.

8. The process of claim 7, wherein the first hub and the first additional hub or the second hub and the second additional hub are connected to the agitator shaft in a lower half of the mixing vessel.

9. The process of claim 7, wherein the at least two blades of the first additional hub or the second additional hub are configured such that a top side or a bottom side thereof is concave.

10. The process of claim 7, wherein the first rotatable impeller system further comprises a third hub that is connected to the agitator shaft, wherein the third hub comprises at least two blades, or
    wherein the second rotatable impeller system further comprises a third hub that is connected to the agitator shaft, wherein the third hub comprises at least two blades.

11. The process of claim 10, wherein the first hub, the first additional hub and the third hub of the first rotatable impeller system are connected to the agitator shaft in the lower half of the first mixing vessel, or
    wherein the second hub, the second additional hub and the third hub of the second rotatable impeller system are connected to the second agitator shaft in a lower half of the second mixing vessel.

12. The process of claim 10, wherein the three blades of the first hub are configured such that a top side or a bottom side of the first hub is concave, wherein the at least two blades of the first additional hub are configured such that a top side or a bottom side of the first additional hub is concave, and wherein the at least two blades of the third hub of the first rotatable impeller system are configured such that a top side or a bottom side of the third hub is concave, or
    wherein the three blades of the second hub are configured such that a top side or a bottom side of the second hub is concave, wherein the at least two blades of the second additional hub are configured such that a top side or a bottom side of the second additional hub is concave, and wherein the at least two blades of the third hub of the second rotatable impeller system are configured such that a top side or a bottom side of the third hub is concave.

13. A process comprising:
preparing a first catalyst slurry comprising a solid particulate catalyst and a carrier liquid in a catalyst slurry preparation system,
wherein the catalyst slurry preparation system comprises:
a mixing vessel,
a rotatable impeller system connected to the mixing vessel, and
a motor connected to the rotatable impeller system,
wherein the rotatable impeller system comprises an agitator shaft and a first hub connected to the agitator shaft,
wherein the first hub and at least a portion of the agitator shaft are positioned within the mixing vessel along a longitudinal axis of the mixing vessel,
wherein the first hub comprises three blades,
wherein the rotatable impeller system further comprises a second hub connected to the agitator shaft, wherein the second hub comprises at least two blades and
wherein the first hub is connected to the agitator shaft in an upper half of the mixing vessel and the second hub is connected to the agitator shaft in a lower half of the mixing vessel.

14. The process of claim 13, wherein the three blades of the first hub are configured such that a top side or a bottom side of the first hub is concave, wherein the at least two blades of the second hub are configured such that a top side or a bottom side of the second hub is concave, or both.

15. A process comprising:
preparing a first catalyst slurry comprising a solid particulate catalyst and a carrier liquid in a catalyst slurry preparation system,
wherein the catalyst slurry preparation system comprises:
a mixing vessel,
a rotatable impeller system connected to the mixing vessel, and
a motor connected to the rotatable impeller system,
wherein the rotatable impeller system comprises an agitator shaft and a first hub connected to the agitator shaft,
wherein the first hub and at least a portion of the agitator shaft are positioned within the mixing vessel along a longitudinal axis of the mixing vessel,
wherein the first hub comprises three blades,
wherein the rotatable impeller system further comprises a second hub connected to the agitator shaft, wherein the second hub comprises at least two blades and
wherein the first hub is above the second hub, and wherein a diameter of the first hub is greater than a diameter of the second hub.

16. The process of claim 15, wherein the three blades of the first hub are configured such that a top side or a bottom side of the first hub is concave, wherein the at least two blades of the second hub are configured such that a top side or a bottom side of the second hub is concave, or both.

17. A process comprising:
preparing a first catalyst slurry comprising a solid particulate catalyst and a carrier liquid in a catalyst slurry preparation system,
wherein the catalyst slurry preparation system comprises:
a mixing vessel,
a rotatable impeller system connected to the mixing vessel, and
a motor connected to the rotatable impeller system,
wherein the rotatable impeller system comprises an agitator shaft and a first hub connected to the agitator shaft,
wherein the first hub and at least a portion of the agitator shaft are positioned within the mixing vessel along a longitudinal axis of the mixing vessel,
wherein the first hub comprises three blades,
wherein the rotatable impeller system further comprises a second hub connected to the agitator shaft, wherein the second hub comprises at least two blades,
wherein the rotatable impeller system further comprises a third hub that is connected to the agitator shaft, wherein the third hub comprises at least two blades, and
wherein the first hub is connected to the agitator shaft in an upper half of the mixing vessel, the second hub is connected to the agitator shaft in a lower half of the mixing vessel, and the third hub is connected to the agitator shaft in the lower half of the mixing vessel.

18. The process of claim 17, wherein the three blades of the first hub are configured such that a top side or a bottom side of the first hub is concave, wherein the at least two blades of the second hub are configured such that a top side or a bottom side of the second hub is concave, wherein the at least two blades of the third hub are configured such that a top side or a bottom side of the third hub is concave, or any combination thereof.

19. A process comprising:
preparing a first catalyst slurry comprising a solid particulate catalyst and a carrier liquid in a catalyst slurry preparation system,
wherein the catalyst slurry preparation system comprises:
a mixing vessel,
a rotatable impeller system connected to the mixing vessel, and
a motor connected to the rotatable impeller system,
wherein the rotatable impeller system comprises an agitator shaft and a first hub connected to the agitator shaft,
wherein the first hub and at least a portion of the agitator shaft are positioned within the mixing vessel along a longitudinal axis of the mixing vessel,
wherein the first hub comprises three blades,
wherein the rotatable impeller system further comprises a second hub connected to the agitator shaft, wherein the second hub comprises at least two blades,
wherein the rotatable impeller system further comprises a third hub that is connected to the agitator shaft, wherein the third hub comprises at least two blades, and
wherein the first hub is connected to the agitator shaft in an upper portion of the mixing vessel, the second hub is connected to the agitator shaft in a middle portion of the mixing vessel, and the third hub is connected to the agitator shaft in a lower portion of the mixing vessel.

20. A process comprising:
preparing a first catalyst slurry comprising a solid particulate catalyst and a carrier liquid in a catalyst slurry preparation system,
wherein the catalyst slurry preparation system comprises:
a mixing vessel,
a rotatable impeller system connected to the mixing vessel, and
a motor connected to the rotatable impeller system,
wherein the rotatable impeller system comprises an agitator shaft and a first hub connected to the agitator shaft, wherein the first hub and at least a portion of the agitator shaft are positioned within the mixing vessel along a longitudinal axis of the mixing vessel, wherein the first hub comprises three blades, wherein the rotatable impeller system further comprises a second hub connected to the agitator shaft, wherein the second hub comprises at least two blades, wherein the rotatable impeller system further comprises a third hub that is connected to the agitator shaft, wherein the third hub comprises at least two blades, and wherein the first hub is above the second hub and the third hub, and wherein a diameter of the first hub is greater than i) a diameter of the second hub, ii) a diameter of the third hub, or iii) a diameter of the second hub and a diameter of the third hub.

* * * * *